US012155845B2

(12) United States Patent
King

(10) Patent No.: US 12,155,845 B2
(45) Date of Patent: Nov. 26, 2024

(54) DECODING IMAGES COMPRESSED USING MIP MAP COMPRESSION

(71) Applicant: Imagination Technologies Limited, Kings Langley (GB)

(72) Inventor: Rostam King, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 18/389,002

(22) Filed: Nov. 13, 2023

(65) Prior Publication Data

US 2024/0080461 A1 Mar. 7, 2024

Related U.S. Application Data

(60) Division of application No. 17/665,764, filed on Feb. 7, 2022, now Pat. No. 11,818,368, which is a (Continued)

(30) Foreign Application Priority Data

Jul. 18, 2016 (GB) ..................................... 1612403

(51) Int. Cl.
*H04N 19/17* (2014.01)
*G06T 7/00* (2017.01)
(Continued)

(52) U.S. Cl.
CPC ............... *H04N 19/17* (2014.11); *G06T 7/97* (2017.01); *G06T 9/00* (2013.01); *G06T 9/008* (2013.01);
(Continued)

(58) Field of Classification Search
CPC ...... H04N 19/17; H04N 19/34; H04N 19/423; H04N 19/59; H04N 19/124; H04N 19/172;
(Continued)

(56) References Cited

U.S. PATENT DOCUMENTS 5,204,899 A 4/1993 Israelsen et al.
5,253,058 A 10/1993 Gharavi
(Continued)

FOREIGN PATENT DOCUMENTS

CN 106060547 * 10/2016 ........... H04N 19/122
EP 0535571 A2 4/1993
(Continued)

OTHER PUBLICATIONS

Beers et al., "Rendering from Compressed Textures," Computer Graphics Proceedings, 1996 Annual Conference Series, Aug. 1996, pp. 373-378.
(Continued)

*Primary Examiner* — Jerome Grant, II
(74) *Attorney, Agent, or Firm* — Potomac Law Group, PLLC; Vincent M DeLuca

(57) ABSTRACT

Methods and apparatus for compressing image data are described along with corresponding methods and apparatus for decompressing the compressed image data. A decoder unit samples compressed image data including interleaved blocks of data encoding a first image and blocks of data encoding differences between the first image and a second image, the second image being twice the width and the height of the first image. A difference decoder decodes a fetched encoded sub-block of the differences between the first and second images and output a difference quad and a prediction value for a pixel, and a filter sub-unit generates a reconstruction of the image at a sample position using decoded blocks of the first image, the difference quad and the prediction value.

20 Claims, 20 Drawing Sheets

Related U.S. Application Data continuation of application No. 16/855,699, filed on Apr. 22, 2020, now Pat. No. 11,284,090, which is a continuation of application No. 16/422,545, filed on May 24, 2019, now Pat. No. 10,674,162, which is a division of application No. 15/651,033, filed on Jul. 17, 2017, now Pat. No. 10,349,061.

(51) Int. Cl.

| | |
|---|---|
| G06T 9/00 | (2006.01) |
| H04N 19/34 | (2014.01) |
| H04N 19/423 | (2014.01) |
| H04N 19/59 | (2014.01) |
| H04N 19/124 | (2014.01) |
| H04N 19/172 | (2014.01) |
| H04N 19/82 | (2014.01) |

(52) U.S. Cl.
CPC .......... *H04N 19/34* (2014.11); *H04N 19/423* (2014.11); *H04N 19/59* (2014.11); *H04N 19/124* (2014.11); *H04N 19/172* (2014.11); *H04N 19/82* (2014.11)

(58) Field of Classification Search
CPC ...... H04N 19/82; H04N 19/50; H04N 19/169; H04N 19/176; H04N 19/42; H04N 19/30; G06T 7/97; G06T 9/00; G06T 9/008; G06T 9/004; G06T 11/40; G06T 15/04
USPC ....................................................... 382/238
See application file for complete search history.

(56) References Cited

U.S. PATENT DOCUMENTS

| | | | |
|---|---|---|---|
| 5,870,144 A | 2/1999 | Guerrera | |
| 6,020,923 A | 2/2000 | Hosaka et al. | |
| 6,184,894 B1 | 2/2001 | Rosman et al. | |
| 6,549,587 B1 * | 4/2003 | Li | H04L 7/0278 375/326 |
| 6,593,925 B1 | 7/2003 | Hakura et al. | |
| 7,193,627 B1 | 3/2007 | Donovan et al. | |
| 9,420,291 B2 | 8/2016 | Zhang et al. | |
| 2007/0253479 A1 | 11/2007 | Mukherjee | |
| 2008/0095235 A1 | 4/2008 | Hsiang | |
| 2008/0165848 A1 | 7/2008 | Ye et al. | |
| 2009/0116760 A1 | 5/2009 | Boon et al. | |
| 2009/0161009 A1 | 6/2009 | Glen | |
| 2014/0267283 A1 | 9/2014 | Nystad et al. | |
| 2015/0049806 A1 | 2/2015 | Choi et al. | |
| 2015/0334411 A1 | 11/2015 | Yamamoto et al. | |
| 2017/0164004 A1 | 6/2017 | Lee et al. | |
| 2017/0329395 A1 | 11/2017 | Flordal | |
| 2018/0020223 A1 | 1/2018 | King | |
| 2018/0063555 A1 | 3/2018 | Raduchel et al. | |
| 2019/0281307 A1 | 9/2019 | King | |
| 2019/0281308 A1 | 9/2019 | King | |
| 2020/0007880 A1 | 1/2020 | Zhao et al. | |

FOREIGN PATENT DOCUMENTS

| | | | | |
|---|---|---|---|---|
| EP | 0739140 | A2 | 10/1996 | |
| EP | 1720358 | A2 | 11/2006 | |
| EP | 2942957 | * | 11/2015 | ............. G06T 9/004 |
| EP | 3091742 | A1 | 11/2016 | |
| GB | 2445008 | A | 6/2008 | |
| JP | 2000299863 | * | 10/2000 | ............ H04N 19/423 |
| JP | 2001526844 | * | 12/2001 | ............ H04N 9/8063 |
| KR | 20140102629 | * | 8/2014 | ............. G06T 9/004 |
| WO | 2008/075027 | A2 | 6/2008 | |

OTHER PUBLICATIONS

Chiu et al., "Vector Quantization of Images with Codeword-Rotation Algorithm," Journal of the Chinese Institute of Engineers, vol. 21, No. 4, Jul. 1998, pp. 389-398.
Ebrahim et al., "MPEG-4 Natural Video Coding—Part II," Multimedia Systems, Standards and Networks, Mar. 2000, pp. 1-27.
Lensch, "Texture Filtering & Sampling Theory," Computer Graphics, Jan. 2008, pp. 1-50.
Ramamurthi et al., "Classified Vector Quantization of Images," IEEE Transactions on Communications, IEEE Service Center, vol. COM-34, No. 11, Nov. 1986, pp. 1105-1115.
Segall et al., "Spatial Scalability with the H.264/AVC Scalable Video Coding Extension," IEEE Transactions on Circuits and Systems for Video Technology, vol. 17, No. 9, Sep. 2007, pp. 1121-1135.
Tsai et al., "Classified Multifilter Up-Sampling Algorithm in Spatial Scalability for H.264/SVC Encoder," IEEE Transactions on Circuits and Systems for Video Technology, vol. 20, No. 6, Jun. 2010, pp. 861-869.

* cited by examiner

**Sub-Block Fetch
DTC 64**

Block Data Layout

Footprint

Sub-Block Data Layout

FIG. 15

High Resolution Patch Generation

DECODING IMAGES COMPRESSED USING MIP MAP COMPRESSION

CROSS-REFERENCE TO RELATED APPLICATIONS AND CLAIM OF PRIORITY

This application is a division under 35 U.S.C. 121 of application Ser. No. 17/665,764 filed Feb. 7, 2022, now U.S. Pat. No. 11,818,368, which is a continuation under 35 U.S.C. 120 of prior application Ser. No. 16/855,699 filed Apr. 22, 2020, now U.S. Pat. No. 11,284,090, which is a continuation of prior application Ser. No. 16/422,545 filed May 24, 2019, now U.S. Pat. No. 10,674,162, which is a continuation of prior application Ser. No. 15/651,033 filed Jul. 17, 2017, now U.S. Pat. No. 10,349,061, which claims foreign priority under 35 U.S.C. 119 from United Kingdom Application No. 1612403.4 filed Jul. 18, 2016, the contents of which are incorporated by reference herein in their entirety. This application is also related to prior application Ser. No. 16/422,470 filed May 24, 2019, now U.S. Pat. No. 10,708,602.

BACKGROUND

In 3D computer graphics, much of the information contained within a scene is encoded as surface properties of 3D geometry. Texture mapping, which is an efficient technique for encoding this information as bitmaps, is therefore an integral part of the process of rendering an image. Textures typically consume a large amount of bandwidth in the rendering pipeline and are therefore often compressed with one of a variety of available hardware-accelerated compression schemes.

It is not usually possible to read directly from textures as the projection of 3D geometry often requires some form of re-sampling. MIP (multum in parvo, meaning "much in little") maps, which comprise a sequence of textures, each of which is a progressively lower resolution representation of a given base texture, are used to increase the speed of rendering by allowing some of this re-sampling to be performed offline. This in turn reduces the bandwidth of texture reads by promoting locality of reference among neighbouring samples. A schematic diagram of a MIP map 100 is shown in FIG. 1. Each successive texture in the sequence of textures 101-106 is half the width and height (i.e. half the resolution) of the previous 2D texture, and the result may be considered as a three-dimensional pyramidal structure with only 4/3 as many samples as the highest resolution texture. Each of these textures 101-106 may be referred to as a NIP map level' and each is a representation of the same base texture, but at a different resolution. Although the MIP map levels shown in FIG. 1 are square, a MIP map does not have to be square (e.g. MIP map levels may be rectangular), nor does it need to be two dimensional, though this is generally the case. These MIP map levels may then be individually compressed with one of a variety of available hardware-accelerated texture compression schemes (e.g. Adaptive Scalable Texture Compression, ASTC, or PowerVR Texture Compression, PVRTC).

When rendering an image using a MIP map, trilinear filtering may be used. Trilinear filtering comprises a combination of two bilinear filtering operations followed by a linear interpolation (or blend). To render an image at a particular resolution (or level of detail), bilinear filtering is used to reconstruct a continuous image from each of the two closest MIP map levels (i.e. the one at a slightly higher resolution than the required resolution and the one at a slightly lower resolution than the required resolution) and then linear interpolation (or blending) is used to produce an image at the intermediate, and required, resolution. Trilinear filtering is the best re-sampling solution supported on all modern graphics hardware. The terms "filtering" and "re-sampling" will be used interchangeably. Alternatively, each of the blending operations may be substituted with "nearest neighbour" sampling, which when applied inter MIP map level only requires a single MIP map level per sample. This form of MIP map sampling produces a poor approximation of the desired texture re-sampling and introduces discontinuities.

Referring back to the example shown in FIG. 1, to render an image at a resolution which is higher than the resolution of texture 103 but lower than the resolution of texture 102, bilinear filtering is used to reconstruct an image from each of the two textures (or MIP map levels) 102, 103 and then a resultant texture is generated by linearly interpolating between the two reconstructed textures.

The embodiments described below are provided by way of example only and are not limiting of implementations which solve any or all of the disadvantages of known methods of encoding and/or decoding texture data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods and apparatus for compressing image data are described along with corresponding methods and apparatus for decompressing the compressed image data. An encoder unit, which generates the compressed image data, comprises an input arranged to receive a first image and a second image, wherein the second image is twice the width and height of the first image, a prediction generator arranged to generate a prediction texture from the first image using an adaptive interpolator, a difference texture generator arranged to generate a difference texture from the prediction texture and the second image and in encoder unit arranged to encode the difference texture.

The encoder unit and decoder unit described herein may be embodied in hardware on an integrated circuit. There may be provided a method of manufacturing, at an integrated circuit manufacturing system, an encoder unit and/or decoder unit as described herein. There may be provided an integrated circuit definition dataset that, when processed in an integrated circuit manufacturing system, configures the system to manufacture an encoder unit and/or decoder unit as described herein. There may be provided a non-transitory computer readable storage medium having stored thereon a computer readable description of an integrated circuit that, when processed, causes a layout processing system to generate a circuit layout description used in an integrated circuit manufacturing system to manufacture an encoder unit and/or decoder unit as described herein.

There may be provided an integrated circuit manufacturing system comprising: a non-transitory computer readable storage medium having stored thereon a computer readable integrated circuit description that describes the encoder unit and/or decoder unit as described herein; a layout processing system configured to process the integrated circuit description so as to generate a circuit layout description of an integrated circuit embodying the encoder unit and/or decoder unit as described herein; and an integrated circuit generation system configured to manufacture the encoder unit and/or decoder unit as described herein according to the circuit layout description.

There may be provided computer program code for performing a method as described herein. There may be provided non-transitory computer readable storage medium having stored thereon computer readable instructions that, when executed at a computer system, cause the computer system to perform the method as described herein.

The preferred features may be combined as appropriate, as would be apparent to a skilled person, and may be combined with any of the aspects of the invention.

BRIEF DESCRIPTION OF THE DRAWINGS

Embodiments of the invention will be described in detail with reference to the accompanying drawings in which:

FIG. 15 is a graphical representation of the application of boundary conditions as in FIG. 14;

Figure 1:
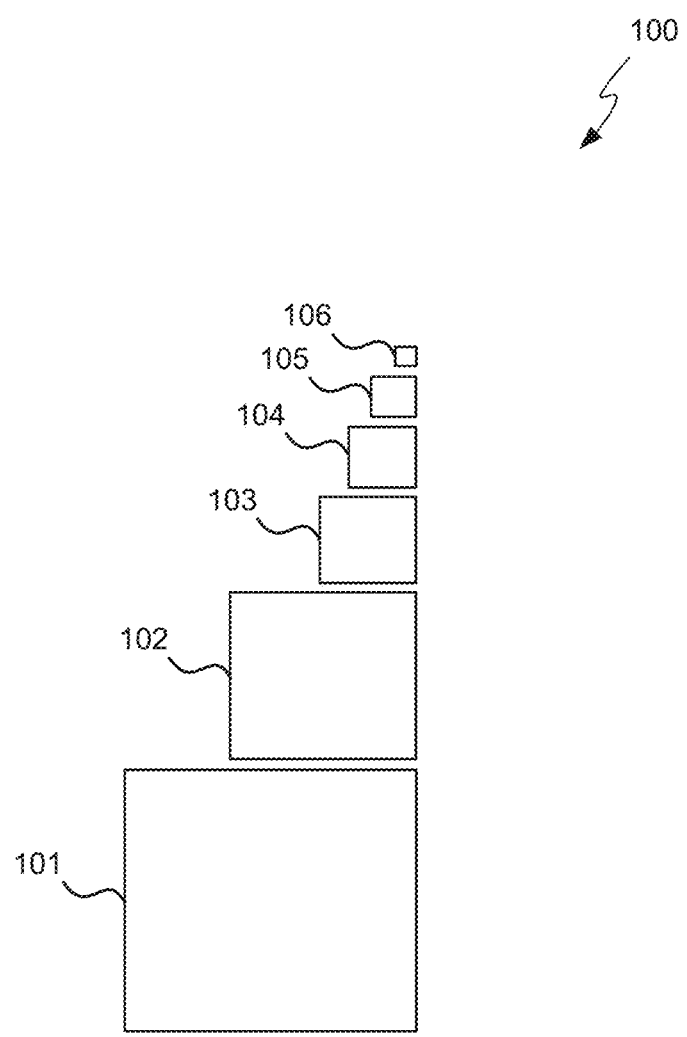
FIG. 1 is a schematic diagram of a MIP map.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Existing texture compression formats do not address the common use of variable-rate sampling in texture mapping. MIP maps facilitate variable-rate sampling (as described above) but consist of independently compressed textures which do not exploit the inherent redundancy in information between adjacent MIP map levels. Indeed, it is precisely this redundancy which enables one to trade off computation against storage in the first place. However, in the case of trilinear filtering, this means that adjacent MIP map levels must be decoded separately from non-local regions of memory, with the performance and bandwidth implications that this entails. It has been appreciated by the inventor that it should, after accounting for the effects of texture compression, be possible to derive all of the data from a single map without incurring undue overhead. Image compression formats in general often leverage some form of scale-based representation to model image statistics so one should be able to efficiently combine decoding and re-sampling.

Described herein is a lossy texture compression format, referred to as Differential Texture Compression (DTC), along with a new filtering algorithm, referred to as the Differential Texture Filter (DTF). Differential Texture Compression encodes two distinct 2D textures into a single, combined, compressed format (henceforth referred to as a differential texture or DTC texture). The second encoded texture is required to be twice the width and height of the first, and they are referred to as the "high" and "low" resolution texture respectively, but they are otherwise independent. In addition to the normal spatial coordinates used to parameterize a texture, a differential texture also has, in an analogous fashion to MIP maps, a "level of detail" (dLOD) parameter (bounded by the interval [0,1], with '0' and '1' representing the high and low resolution textures respectively). The Differential Texture Filter provides an efficient way to accelerate trilinear filtering of pairs of DTC textures using this extra dLOD parameter as input. By choosing appropriate pairs of levels of detail to be compressed together, a MIP map can be constructed from a plurality of DTC textures. A DTC encoded MIP map then provides the flexibility to combine conventional MIP map sampling with DTF sampling, which allows trilinear filtering to be performed over a range of level of detail without the need to read from more than one MIP map level. The methods of generating a DTC texture and corresponding hardware to perform the methods are also described.

There are many effects of using DTC: it can increase the effective number of textures in a MIP map without additional storage cost, it allows for the design of potentially higher quality reconstruction filters through the manipulation of the additional detail (dLOD) parameter, and it reduces or entirely eliminates the need for conventional trilinear filtering. By reducing or eliminating conventional trilinear filtering, use of DTC reduces bandwidth throughout the graphics engine (including to/from main memory) and increases sample throughput (as the overall number of independent filtering operations is reduced).

Figure 2:
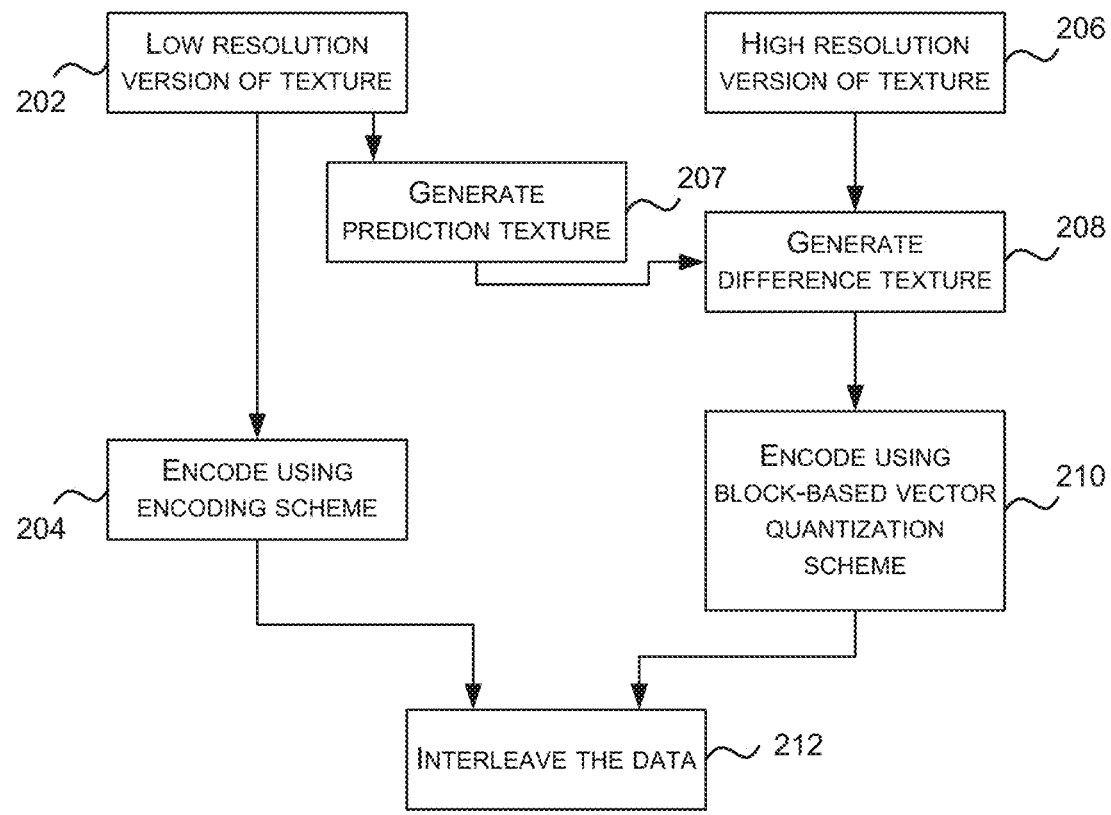
FIG. 2 is a schematic diagram showing an example method of generating a single DTC texture.

FIG. 2 is a schematic diagram showing an example method of generating a single DTC texture. As shown in FIG. 2, a low resolution texture 202 (i.e. a low resolution bitmap image) is encoded directly (block 204) using an encoding scheme such as ASTC or ETC (Ericsson Texture Compression). The high resolution texture 206 is not encoded directly but instead the low resolution texture 202 is used as a predictor and a difference texture is generated (block 208) which comprises, for each texel of the high resolution texture, the difference between this prediction and its true value. In more concrete terms, a prediction stage of the method takes the low resolution texture and generates a prediction texture (block 207), which is twice the width and height of the low resolution texture (thereby matching the high resolution texture). The prediction texture (which may also be referred to as a prediction image) is formed from the low resolution texture using an adaptive interpolator. The difference texture (which may also be referred to as a difference image), which has been generated from the prediction texture and the high resolution texture (in block 208), is then encoded (block 210) alongside data to determine the adaptive interpolator. In the examples described herein a block-based vector quantization scheme is used to encode the difference texture (in block 210); however, an alternative compression scheme may be used. The two encoded textures may then be interleaved (block 212) to ensure locality of reference or they may be stored separately.

The block-based vector quantization scheme which may be used to encode the difference texture (in block 210) discards colour information (effectively applying chroma subsampling to the high resolution image) and uses one, two or more distinct hard-coded vector lookup tables (or dictionaries) to encode groups of 4×2 texels in single entries. It is also responsible for encoding the adaptive interpolation used to generate the prediction texture. Where two or more tables are used, each table may be identified with a prediction mode that determines the form of the adaptive interpolation over a local region and which may be chosen on a per-block basis (i.e. per block of data which is interleaved in block 212) to improve the quality of the results. Where more than two vector lookup tables are available, the lookup tables may be grouped, with different groups (e.g. pairs) of lookup tables being used for different types of difference textures and a particular group may be selected for use based on texture header information.

Figure 3:
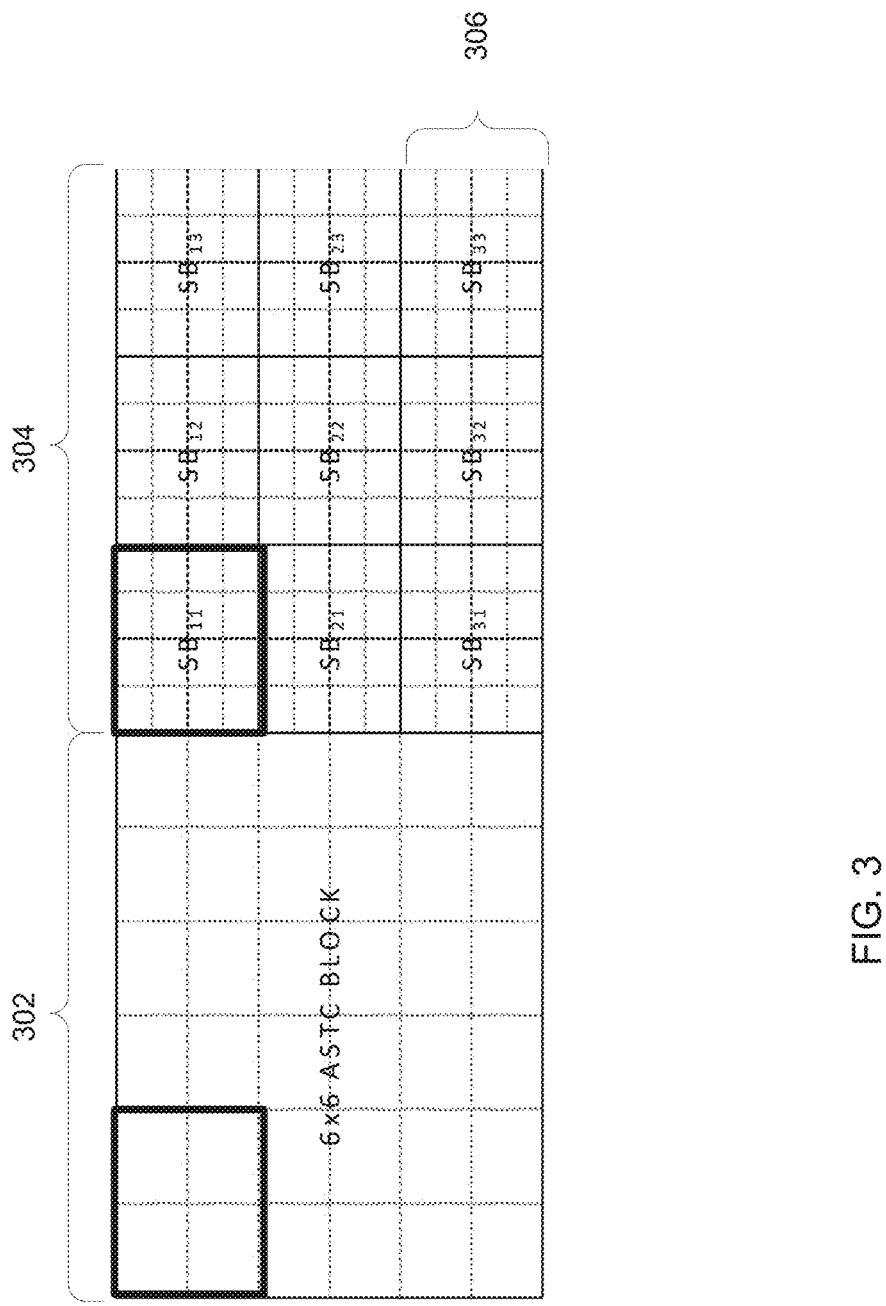
FIG. 3 is a schematic diagram showing the 128 bit 6×6 (ASTC) compressed block texel footprint.

In various examples, the block-based vector quantization scheme (in block 210) operates on a 4N×4M difference block (i.e. it comprises 4N×4M texels at the high resolution), where N and M are integers. Where interleaving is used (in block 212), the values of N and M may be selected such that the size of the difference block matches the size of the blocks used in the encoding of the low resolution texture 202 (in block 204), i.e. such that the blocks used in the encoding of the low resolution texture 202 comprise 2N×2M texels. For example, as shown in FIG. 3, if ASTC is used to encode the low resolution texture 202 (in block 204), the size of the ASTC block 302 is 6×6 texels at the lower resolution, so that the matching difference block 304 will comprise 12×12 texels, i.e. N=M=3. If, however, ETC is used to encode the low resolution texture 202 (in block 204), the size of the ETC block is 4×4 texels at the lower resolution, so that the matching difference block will comprise 8×8 texels, i.e. N=M=2. For the purposes of the following explanation, it is assumed that N=M=3; however it will be appreciated that in an implementation of DTC these parameters may have other values and in some implementations N≠M.

The difference block 304 may be subdivided into a plurality of sub-blocks 306 each comprising 4×4 texels at the high resolution. These sub-blocks form the basic units of compression and each one is encoded by indexing two vectors from a hard-coded lookup table. A lookup table defines a plurality of 4×2 vectors (e.g. 32 4×2 vectors) and so a sub-block can be compressed by splitting the sub-block in half (each half comprising 4×2 texels) and then referencing two vectors from the lookup table. In this way, a sub-block can be compressed to a series of bits which identify the two vectors in the lookup table. To perform the encoding, the encoder may evaluate every possible sub-block encoding in turn, until the best match is found.

Figure 4:
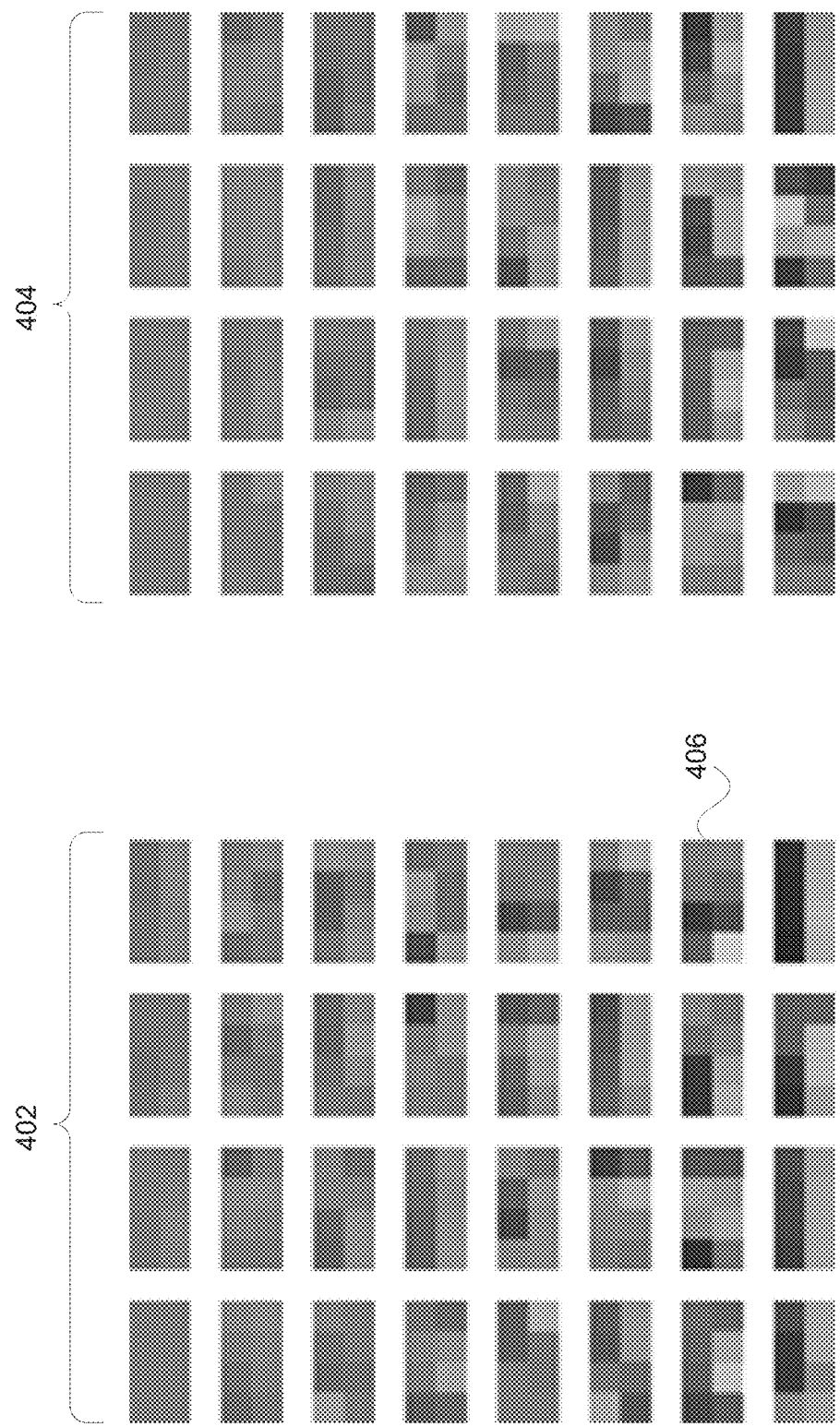
FIG. 4 shows a graphical representation of two example vector lookup tables.

The list of available vectors may be increased by having more than one lookup table, for example by having two lookup tables and including an extra bit (or bits, where there are more than two lookup tables) to identify which lookup table was used to encode the block (the same table is used for all the sub-blocks in a difference block). The extra bit may be referred as identifying a 'prediction mode' (because the different sets of vectors are constructed to suit the characteristic statistics of the high resolution differences which will be different depending upon which interpolation mode is used for the low resolution texture) and FIG. 4 illustrates an example set of available vectors 406 where two lookup tables 402, 404 are used. In the implementation shown in FIG. 4, if the prediction mode bit is set, each high resolution texel will be predicted with a 50/50 blend of nearest neighbour and bilinear interpolation of the low resolution texture and the right set of vectors 404 is used. If the prediction mode is not set, pure nearest neighbour sampling is used and the left set of vectors 402 is used. In this way, the prediction mode is used to control the adaptive interpolation and to determine which lookup table to use.

Whilst the lookup tables 402, 404 shown in FIG. 4 use different shadings to graphically represent the differences, each entry in a lookup table may comprise 8 5-bit two's complement values. In this case, upon retrieval these values must be first sign-extended to 9-bit signed integers, and then rescaled by a factor of 2, for the first half of the table entries (V=0 to V=15), or by a factor of 4, for the second half (V=16 to V=31). Two example tables A and B, corresponding to prediction modes 0 and 1 respectively, are shown below, with each 4×2 entry divided into left (L) and right (R) (2×2) halves and given in hexadecimal notation,

| Lookup table A: | | | | | | | | |
|---|---|---|---|---|---|---|---|---|
| V | $L_A$ | $L_B$ | $L_C$ | $L_D$ | $R_A$ | $R_B$ | $R_C$ | $R_D$ |
| 0 | 00 | 00 | 00 | 00 | 00 | 00 | 00 | 00 |
| 1 | 1F | 1F | 02 | 03 | 00 | 01 | 01 | 00 |
| 2 | 1E | 1D | 02 | 00 | 1E | 1F | 1F | 1F |
| 3 | 1E | 1E | 02 | 02 | 1D | 1D | 03 | 03 |
| 4 | 1B | 1D | 1F | 01 | 00 | 02 | 02 | 04 |
| 5 | 1F | 02 | 1F | 01 | 03 | 19 | 04 | 00 |
| 6 | 03 | 1F | 00 | 1E | 1A | 00 | 00 | 06 |
| 7 | 1C | 06 | 1F | 00 | 02 | 00 | 1C | 03 |
| 8 | 08 | 1B | 00 | 1D | 1D | 02 | 00 | 00 |
| 9 | 19 | 1B | 05 | 05 | 01 | 02 | 01 | 1C |
| 10 | 1F | 1D | 1F | 04 | 1A | 1B | 07 | 03 |
| 11 | 1E | 18 | 05 | 03 | 18 | 05 | 1E | 04 |
| 12 | 18 | 00 | 1B | 09 | 02 | 1E | 05 | 1B |
| 13 | 19 | 19 | 06 | 05 | 1B | 1C | 04 | 05 |
| 14 | 00 | 02 | 00 | 00 | 1F | 10 | 06 | 05 |
| 15 | 13 | 04 | 07 | 1C | 07 | 1C | 1C | 1F |
| 16 | 00 | 00 | 00 | 1F | 1C | 1C | 1F | 06 |

| Lookup table A: | | | | | | | | |
|---|---|---|---|---|---|---|---|---|
| V | $L_A$ | $L_B$ | $L_C$ | $L_D$ | $R_A$ | $R_B$ | $R_C$ | $R_D$ |
| 17 | 01 | 19 | 02 | 02 | 1C | 01 | 03 | 1F |
| 18 | 1C | 1D | 02 | 04 | 00 | 1B | 05 | 1D |
| 19 | 02 | 19 | 06 | 1C | 1F | 00 | 00 | 00 |
| 20 | 05 | 1F | 1B | 1E | 1B | 1C | 03 | 03 |
| 21 | 00 | 01 | 1F | 01 | 02 | 18 | 06 | 1C |
| 22 | 1D | 1C | 02 | 04 | 1B | 1A | 04 | 04 |
| 23 | 03 | 1C | 02 | 1C | 19 | 00 | 1D | 06 |
| 24 | 19 | 1C | 1C | 08 | 1D | 1E | 05 | 1D |
| 25 | 16 | 02 | 1F | 05 | 04 | 1B | 03 | 1B |
| 26 | 17 | 17 | 06 | 04 | 1E | 01 | 01 | 1F |
| 27 | 1C | 17 | 0A | 1A | 1F | 00 | 1E | 01 |
| 28 | 01 | 17 | 04 | 01 | 17 | 1A | 05 | 05 |
| 29 | 18 | 19 | 05 | 05 | 19 | 1A | 05 | 04 |
| 30 | 16 | 17 | 04 | 07 | 1C | 1C | 07 | 1D |
| 31 | 14 | 15 | 06 | 07 | 15 | 16 | 06 | 06 |

| Lookup table B: | | | | | | | | |
|---|---|---|---|---|---|---|---|---|
| V | $L_A$ | $L_B$ | $L_C$ | $L_D$ | $R_A$ | $R_B$ | $R_C$ | $R_D$ |
| 0 | 00 | 00 | 00 | 00 | 00 | 00 | 00 | 00 |
| 1 | 01 | 01 | 00 | 01 | 00 | 00 | 01 | 00 |
| 2 | 1F | 1F | 01 | 01 | 1F | 00 | 01 | 01 |
| 3 | 1F | 1F | 00 | 00 | 1E | 1E | 00 | 1F |
| 4 | 01 | 00 | 00 | 1F | 1F | 1F | 00 | 05 |
| 5 | 1F | 1F | 03 | 04 | 1E | 1F | 02 | 01 |
| 6 | 1F | 01 | 03 | 03 | 02 | 02 | 03 | 02 |
| 7 | 01 | 02 | 1F | 02 | 01 | 1B | 03 | 1F |
| 8 | 1C | 1C | 1C | 00 | 1E | 01 | 04 | 04 |
| 9 | 02 | 1B | 07 | 1E | 1D | 00 | 1E | 00 |
| 10 | 1D | 1C | 02 | 02 | 1B | 1B | 03 | 03 |
| 11 | 19 | 19 | 00 | 1E | 1C | 1E | 1E | 1E |
| 12 | 05 | 00 | 05 | 07 | 1D | 1A | 05 | 1D |
| 13 | 1B | 1B | 06 | 07 | 1D | 1F | 06 | 05 |
| 14 | 1A | 06 | 1B | 02 | 0A | 00 | 02 | 1B |
| 15 | 1D | 05 | 1E | 1C | 06 | 16 | 00 | 07 |
| 16 | 00 | 1F | 1F | 00 | 1C | 1D | 02 | 06 |
| 17 | 00 | 1F | 00 | 1E | 1B | 1F | 1C | 04 |
| 18 | 1A | 1F | 03 | 04 | 02 | 02 | 01 | 00 |
| 19 | 1F | 1D | 1F | 1F | 1C | 05 | 00 | 06 |
| 20 | 01 | 19 | 04 | 02 | 1B | 01 | 1E | 1C |
| 21 | 1D | 1C | 1F | 01 | 19 | 1B | 02 | 04 |
| 22 | 1D | 1C | 04 | 04 | 1B | 1B | 03 | 03 |
| 23 | 19 | 1E | 1B | 05 | 02 | 02 | 04 | 00 |
| 24 | 00 | 03 | 00 | 02 | 03 | 17 | 05 | 1D |
| 25 | 1C | 1C | 03 | 07 | 1D | 1C | 05 | 1D |
| 26 | 1B | 19 | 1C | 05 | 1A | 03 | 05 | 02 |
| 27 | 02 | 1D | 01 | 03 | 19 | 17 | 06 | 03 |
| 28 | 00 | 1D | 00 | 1C | 16 | 04 | 1A | 08 |
| 29 | 01 | 1E | 1E | 1C | 17 | 19 | 1C | 09 |
| 30 | 17 | 04 | 1E | 06 | 09 | 1A | 1E | 18 |
| 31 | 17 | 17 | 05 | 05 | 17 | 18 | 04 | 03 |

The list of available vectors may be doubled through the inclusion of an extra flip bit for each vector (i.e. two for each sub-block) which flips each vector 406 along its long axis. The sub-block (formed from the two 4×2 vectors) may also be rotated into one of four orientations using rotation bits specified for each sub-block. Furthermore, in some implementations a further bit may be used to indicate that for the entire difference block, the size of the differences are doubled and in other implementations (e.g. where PVRTC or ETC is used) it may be possible to specify whether the differences are doubled or not per 4×2 vector. This may be used to better encode regions of high contrast. By expanding the list of available vectors in this way, it increases the number of possible sub-block encodings (including cycling through each possible orientation) which can be evaluated to find the best match without increasing the size of the look-up tables.

Figure 5:
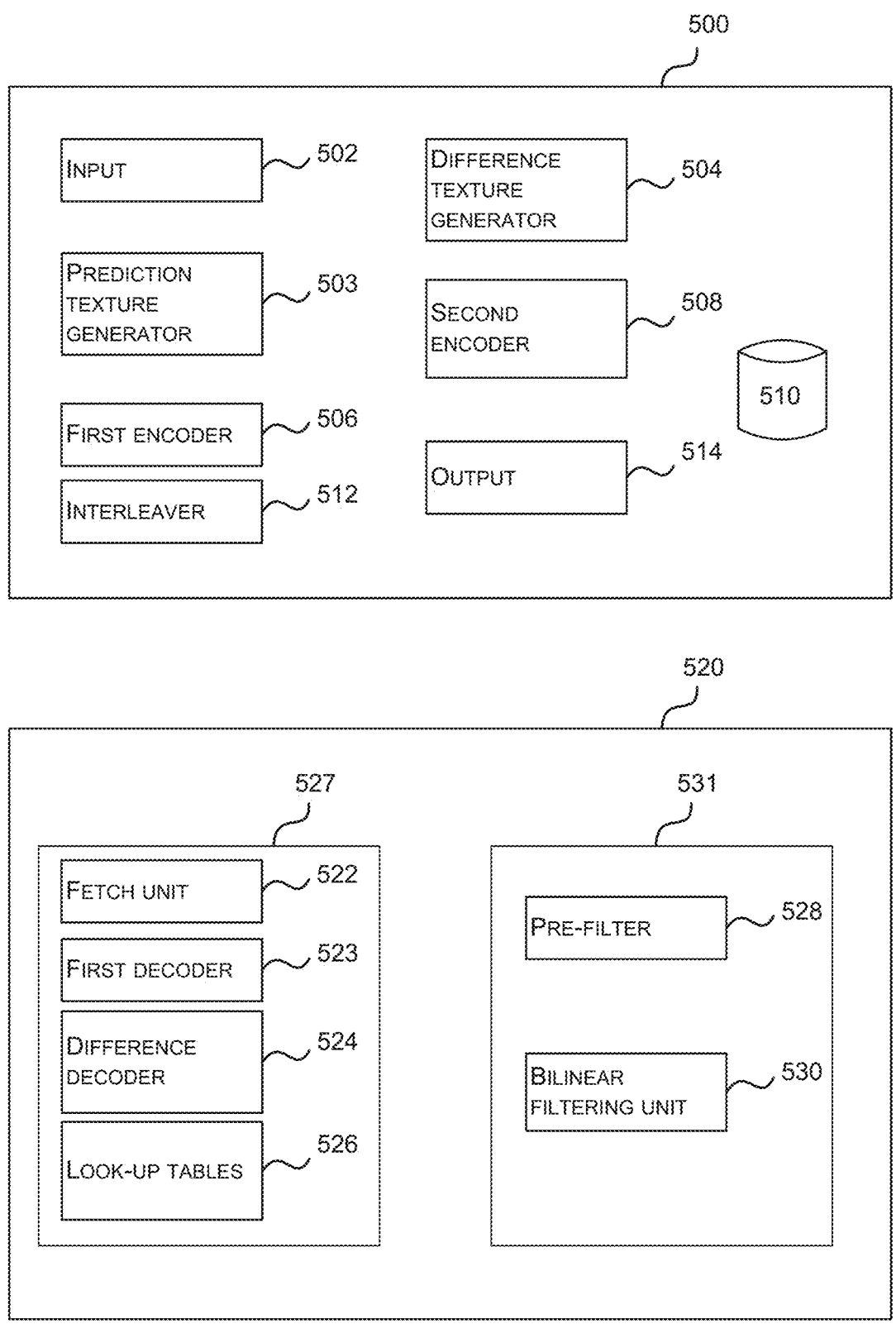
FIG. 5 shows a schematic diagram of an example encoder and an example decoder/filter.

The DTC textures may be generated using the method of FIG. 2 by an encoder 500 as shown in FIG. 5. The encoder 500 may encode the difference textures offline (in software) or online (in hardware) and if the encoder 500 is used to generate a MIP map, its precise structure of will also depend on the properties of the MIP map. The encoder 500 comprises an input 502 for receiving both the low resolution and the high resolution textures 202, 206 or, as described below, one or both of these may be generated within the encoder 500. The encoder 500 further comprises a prediction texture generator 503 which generates the prediction texture (as in block 207) and difference texture generator 504 which generates the difference texture using the prediction texture and the high resolution input texture 202 (as in block 208). The encoder 500 may comprise two encoder units 506, 508: a first encoder unit 506 encodes the low resolution texture 202 (as in block 204, e.g. using ASTC, PVRTC or ETC) and a second encoder unit 508 encodes the difference texture (as in block 210) using the vector lookup tables which may be stored in a data store 510. If the input low resolution texture is already encoded, then the first encoder 506 is not required and instead the encoder 500 comprises a decoder unit which decodes the input encoded low resolution texture so that the prediction texture can be generated (in block 207). An interleaver unit 512 within the encoder 500 interleaves the blocks of data (as in block 212) i.e. it interleaves an encoded block of the low resolution texture and an encoded difference block and then the encoded data which forms the DTC texture is output via an output 514 (e.g. to memory).

In an example, the encoder 500 may take a previously ASTC/PVRTC/ETC-compressed MIP map (at the appropriate 3.56/4 bits per pixel compression rate) as input and use adjacent MIP map levels to generate the difference textures. There is no need to encode the low resolution texture as this has already been done, but interleaving is performed after difference textures are generated (e.g. after all the difference textures have been generated). In an online hardware-based approach, the difference textures may make use of the hardware decoder of both ASTC/PVRTC and DTC to evaluate different encodings. As difference textures can only be generated when adjacent MIP map levels are related by a scale factor of 2, a "full" set of difference textures will only be generated for a "power of two" texture. Once the procedure is complete, the top level texture may be optionally discarded, where retaining it implies the use of bilinear magnification of the top level in place of DTC when the LOD is below zero.

In another example, the encoder 500 may take a single texture (or MIP map) and generate the low and high resolution texture pairs in tandem with the encoding (e.g. the input textures 202, 206 may be generated in parallel with encoding the low resolution texture in block 204). A number of options will exist for how to produce these textures, including choice of filtering kernel and how to handle odd dimensions. After these textures are produced, the high and low resolution versions of the texture can be input to the difference texture generator and the encoder 500 can proceed as described above with reference to FIG. 2.

FIG. 5 also shows a schematic diagram of a decoder/filter unit 520 which is used to sample a DTC texture as described above. The decoder/filter unit 520 comprises a fetch unit 522 which fetches the encoded blocks of data from the DTC texture, a first decoder 523 which decodes the encoded blocks of data from the low resolution texture (which may be encoded using ASTC, PVRTC or ETC), a difference decoder 524 which recreates the difference texture using hard-coded lookup tables 526 and these four elements may be considered to be part of a decoder sub-unit 527. The decoder/filter unit 520 further comprises two filtering elements: a pre-filter 528 and a bilinear filtering unit 530 which may be considered to be part of a filter sub-unit 531 (this constitutes the logic of the Differential Texture Filter). Whilst the decoding and filtering techniques described herein may be used together, it will be appreciated that they may also be used independently of each other (e.g. where a different decoding technique or a different filtering technique is used).

Figure 6:
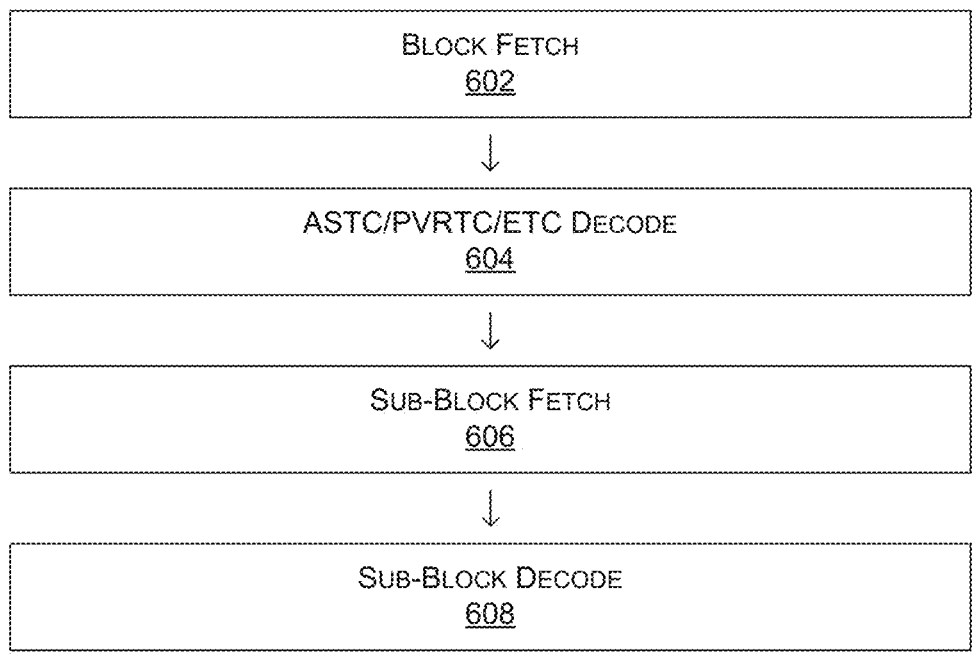
FIG. 6 is a flow diagram showing an example DTC decoder pipeline.

The operation of the decoder sub-unit 527 can be described with reference to FIGS. 6-12. As shown in FIG. 6, the decoder sub-unit 527 fetches encoded blocks of data (block 602, in the fetch unit 522), where, as described above and shown in FIG. 3, encoded blocks of the low resolution texture (e.g. block 302) are interleaved with encoded blocks of the difference texture (e.g. block 304). The decoder sub-unit 527 then decodes the encoded blocks of the low resolution texture which have been fetched (block 604, in the first decoder 523) where as described above, the blocks of the low resolution texture may be encoded using ASTC, PVRTC or ETC.

The decoder sub-unit 527 also fetches encoded sub-blocks of data from the corresponding encoded difference blocks (block 606, in the fetch unit 522) and although this is shown separately from the fetching of the encoded blocks of the low resolution data (in block 602), the two fetch operations (blocks 602 and 606) may be performed at the same time.

The fetch unit 522 uses a modified texture lookup function (compared to conventional texture lookups) because although texel coordinates are calculated using the (low resolution) texture dimensions, the fractional coordinates (e.g. two bits) of a sample of interest at position (u,v) cannot be discarded, or simply provided to the bilinear filtering unit 530 (as in conventional trilinear filtering) as they are used by the pre-filter 528 as described below.

In particular, a conventional bilinear texture lookup maps (u,v) to (u*w−0.5, v*h−0.5) where w and h are the width and height of the texture respectively. The integral part of these coordinates is used to index four neighbouring texels, applying boundary conditions as necessary. The fractional part is converted to a fixed point value and used for bilinear interpolation.

The modified lookup which is performed by the fetch unit 522, uses the same mapping, with the width and height of the lower resolution texture as the supplied dimensions. Four neighbouring low resolution texels are indexed from the integral parts of the coordinates, as before. The same values are also used to index four neighbouring groups of four differences with their associated prediction modes. The fractional parts of the coordinates are multiplied by 4; the integral parts of the result of the multiplication by 4 are sent to the pre-filter 528 as two 2 bit values and the remaining fractional part (of the result of the multiplication by 4) is sent to the bilinear filtering unit 530.

Figure 10:
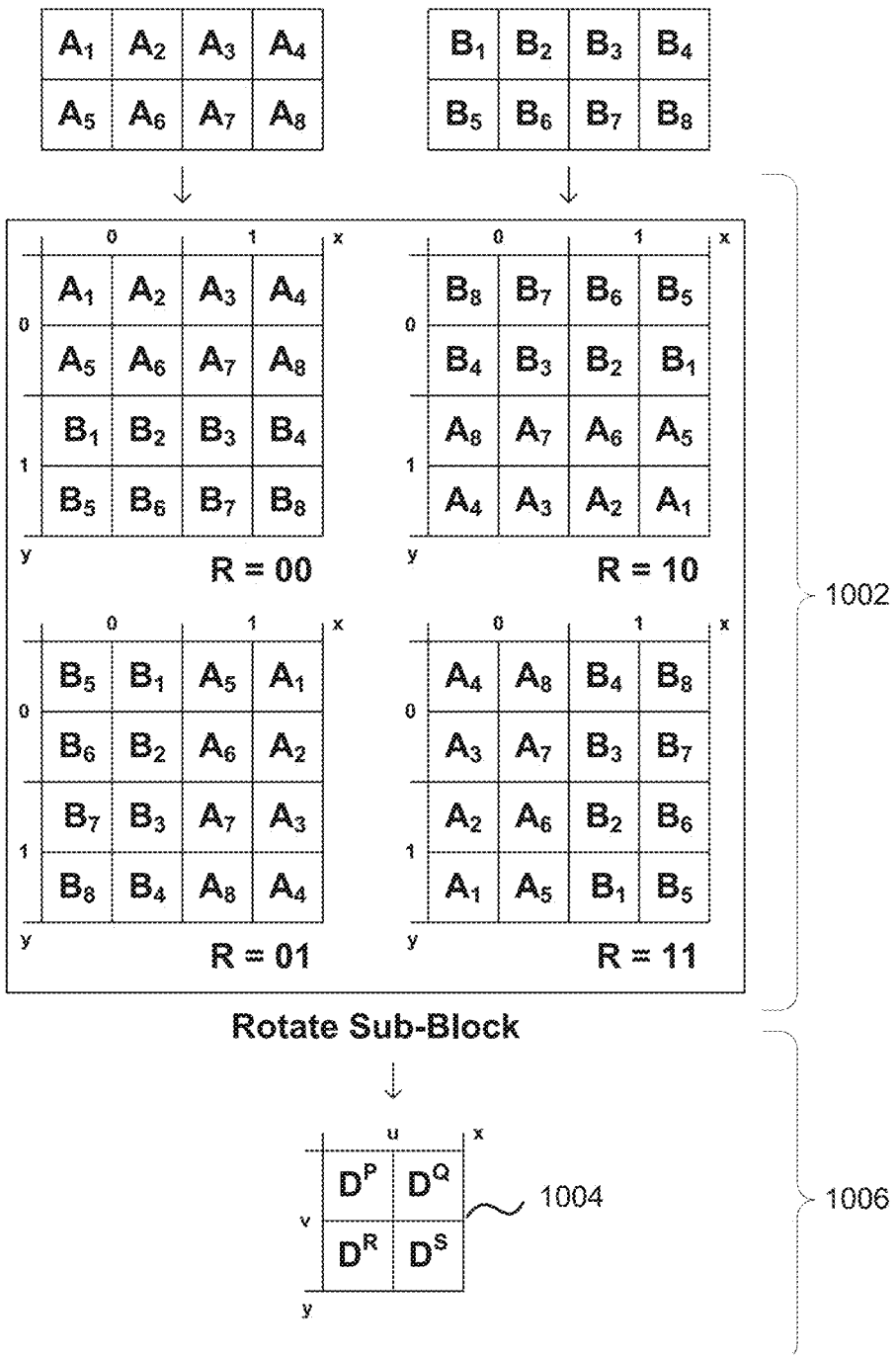
FIG. 10 is a graphical representation of a second stage of example decode operation from FIG. 6.
Figure 12:
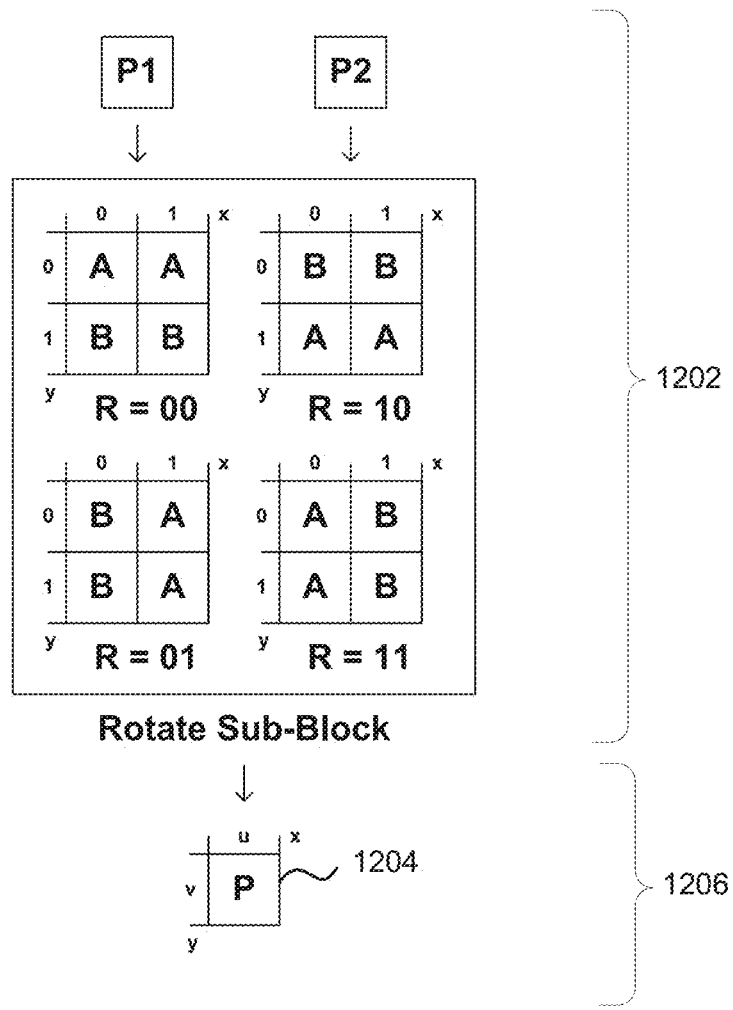
FIG. 12 is a graphical representation of a fourth stage of example decode operation from FIG. 6.
Figure 13:
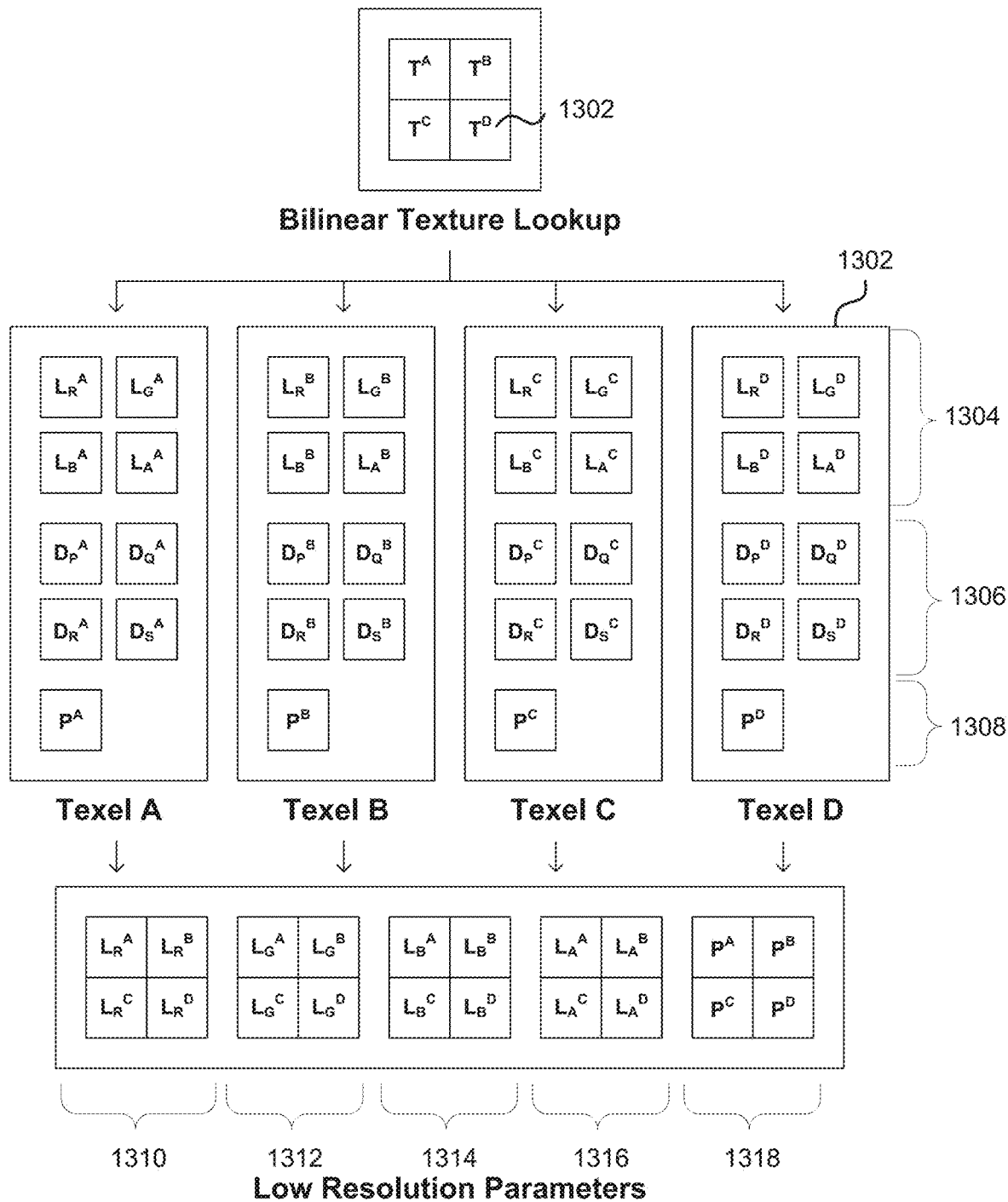
FIG. 13 is a graphical representation of the data generated by the pipeline of FIG. 6.

As a result of each high resolution texture always being twice the width and height of the low resolution texture, each low resolution texel corresponds to four high resolution texels. Each texture fetch (using the method of FIG. 6) therefore fetches:

- 1 low resolution texel (L)—fetched in block 602 and decoded in block 604
- 4 differences (DpQRs)—these may be 9-bit signed values—as output from the second stage of the sub-block decode operation (block 608) as shown in FIG. 10 and described below
- 1 prediction mode (P)—this may be 2 bits—as output from the fourth stage of the sub-block decode operation (block 608) as shown in FIG. 12 and described below Using the method of FIG. 6, the fetch unit 522 can fetch all the required data to perform trilinear filtering with just four addresses, which is the same as for conventional bilinear filtering and this is shown graphically in FIG. 13. FIG. 13 shows, for each of the four texels 1302 (labelled A-D), one low resolution texel, 1304 (labelled L, comprising R, G, B and alpha channels, where the alpha channel is shown by the sub-script A), four differences 1306 and one prediction mode 1308. Of the fetched data 1304-1308, all the parameters are considered low resolution parameters except for the four difference quads 1306 and the low resolution parameters can be considered as five 2×2 quads 1310-1318—one each for the R, G, B and alpha channels 1310-1316 and one for the prediction modes 1318.

The interleaving of the block data together with the correspondence in texture dimensions means that the encoded blocks cover the same area of a texture (in terms of the (u,v) coordinate system). The filter is trying to mimic trilinear filtering so it needs to fetch the data from each map that would be required to perform this operation. That means that two bilinear patches i.e. a set of four texels are fetched from each map. The nature of trilinear filtering is such that the bilinear texel footprint of the higher resolution map is always a subset of the footprint of the lower resolution map whenever the samples are aligned in a 2:1 ratio. If blocks are fetched such that their union covers the low resolution bilinear texel footprint, then these also cover the high resolution bilinear footprint and all the data needed for trilinear filtering has been fetched.

Figure 7:
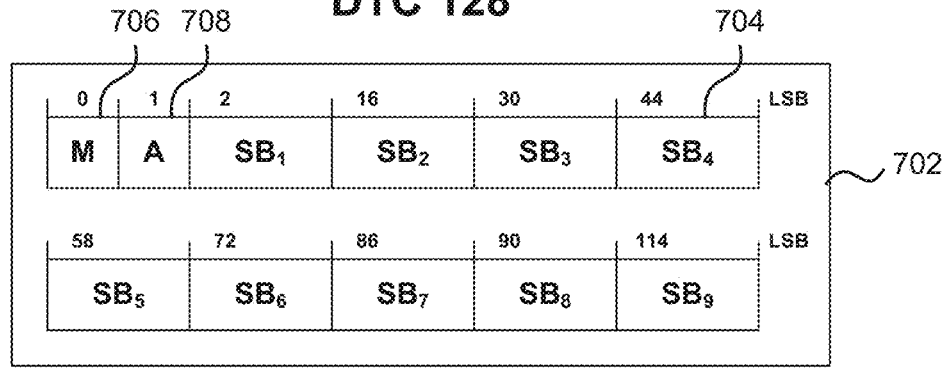
FIG. 7 is a graphical representation of a first example fetch operation from FIG. 6.
Figure 7:
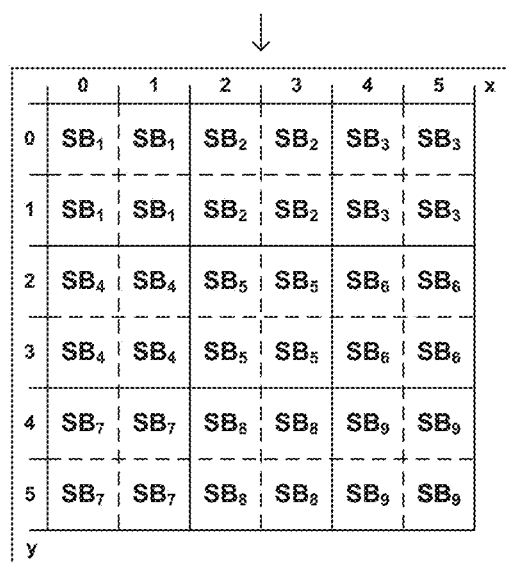
Figure 7:
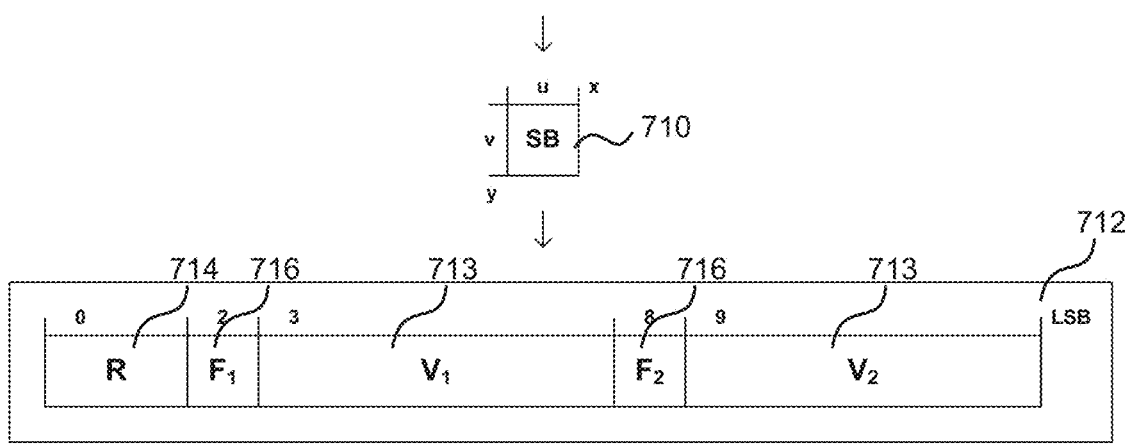
Figure 8:
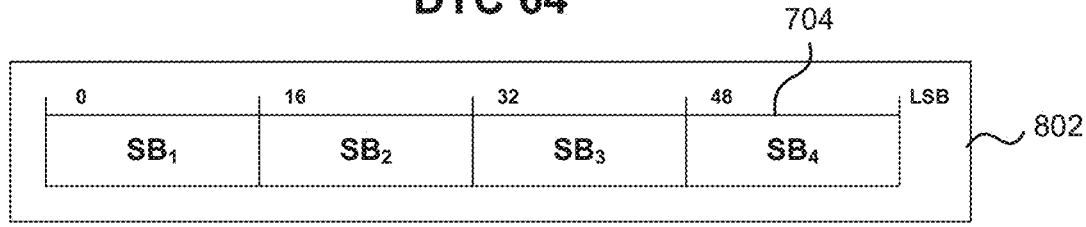
FIG. 8 is a graphical representation of a second example fetch operation from FIG. 6.
Figure 8:
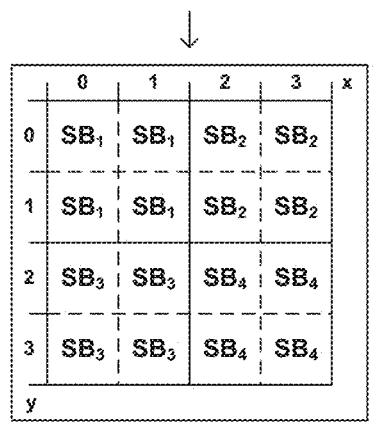
Figure 8:
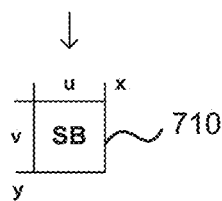
Figure 8:
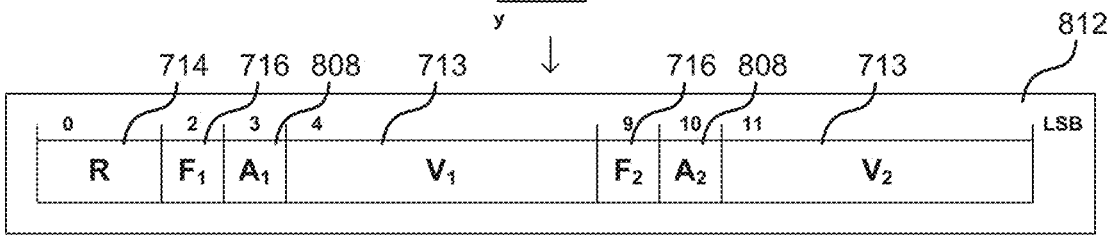

Referring back to FIG. 3, a single sub-block 306 is fetched from the encoded difference block 304 per texture fetch. The sub-block fetch (in block 606) may operate slightly differently depending upon the precise structure of the difference block (e.g. block 304 in FIG. 3) and two example difference block layouts are shown in FIGS. 7 and 8. FIG. 7 shows a first example block data layout 702 for a 128-bit difference block and FIG. 8 shows a second example block data layout 802 for a 64-bit difference block. Each layout 702, 802 comprises a plurality of encoded sub-blocks 704 (denoted $SB_i$ and comprising 14 bits in the case of DTC 128 and 16 bits in the case of DTC 64). The 128-bit block 702 also comprises a prediction mode bit 706 (denoted M) which identifies the lookup table from which the vectors are selected and an optional scaling factor bit 708 (denoted A) which indicates whether the differences should be doubled or not (as described above). The 64-bit block 804 does not comprise a prediction mode bit and so where multiple lookup tables are available, a default table (and hence a default value for M e.g. M=0) may be used. The size of the difference block 304, 702, 802 may be selected to match the size of the encoded low resolution block 302 so that the blocks can be interleaved and this ensures locality of reference.

As shown in FIG. 7, the 128-bit difference block 702 comprises 9 sub-blocks and as shown in FIG. 8, the 64-bit difference block 802 comprises 4 sub-blocks. The sub-block fetch operation (block 606) selects a single sub-block 710 from the difference block 702, 802 using u,v parameters. The u,v parameters here are the texel offset within each block. The sub-block data layouts 712, 812 are also shown in FIGS. 7 and 8. It can be seen that whilst there is a single scaling factor bit (A) for the entire block in the 128-bit example 702, in the 64-bit example 812, the scaling factor 808 (denoted $A_j$ where j={1,2}) can be set per vector 713 (denoted $V_j$ where j={1,2}) within a sub-block, where a vector corresponds to half a sub-block. As shown in FIGS. 7 and 8, each sub-block 712, 812 comprises two rotation bits 714 (denoted R) and a flip bit 716 for each vector (denoted $F_j$ where j={1,2}).

Figure 9:
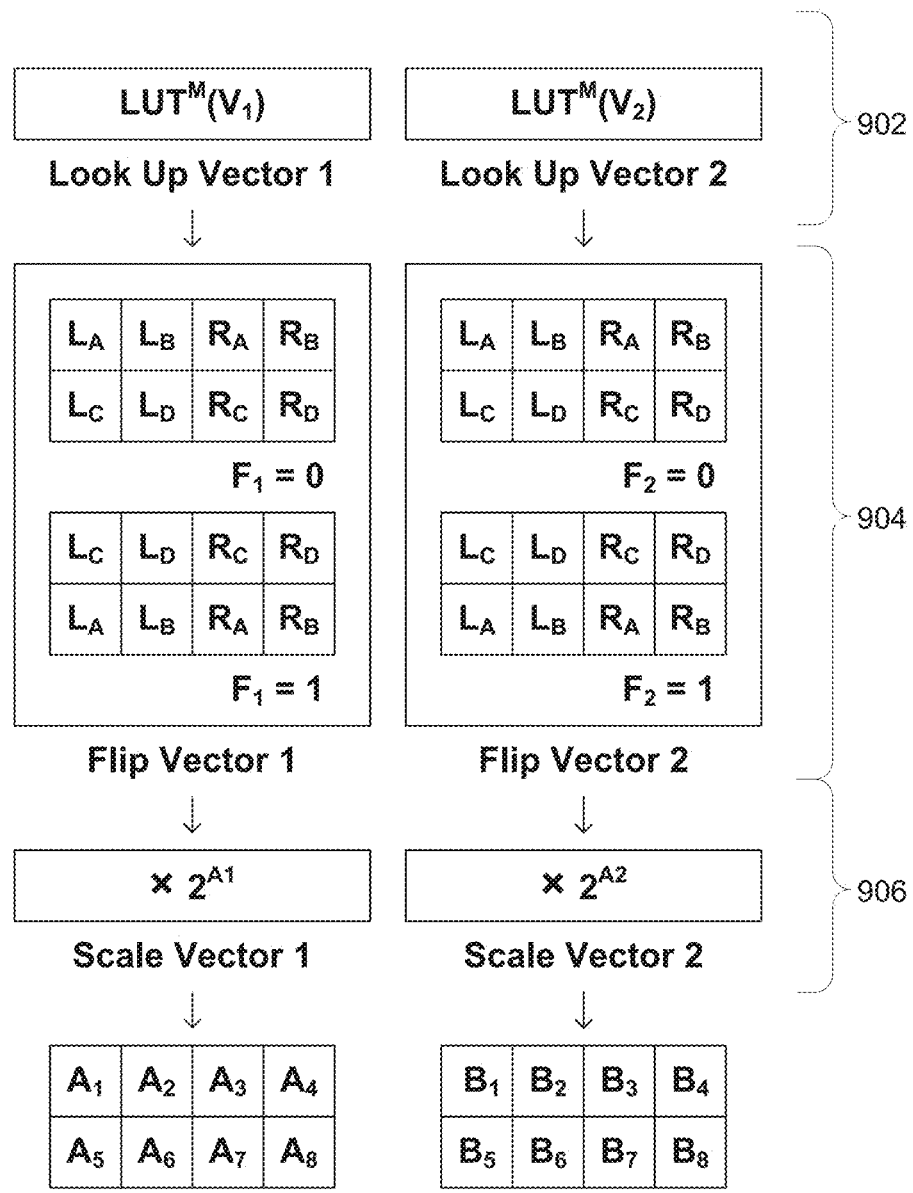
FIG. 9 is a graphical representation of a first stage of example decode operation from FIG. 6.

The sub-block decode operation (block 608, in the difference decoder 524) can be described with reference to FIGS. 9-12 and once at the sub-block stage, operates in the same way irrespective of the size of the difference block. FIG. 9 shows a first stage in the sub-block decode operation which uses the lookup tables 526. Based on the value of M (which as described above may be specified on a difference block level or have a default value), the two vectors $V_1$ and $V_2$ are identified (operation 902). The identified vectors are then flipped or not based on the values of $F_1$ and $F_2$ 716 (operation 904) and scaled, where required based on the value of the scaling bit(s) (operation 906). If there is only a single scaling bit 708 then instead of using $A_1$ and $A_2$ 808 (as shown in FIG. 9), the single value A 708 is used for both vectors $V_1$ and $V_2$.

FIG. 10 shows a second stage in the sub-block decode operation in which the two vectors are combined to form the sub-block and the sub-block is rotated based on the two rotation bits R 714 (operation 1002). A single difference quad 1004 is then selected from the rotated sub-block using the least significant bits of the u,v coordinates (operation 1006).

Although FIGS. 9 and 10 show the assembly of a complete sub-block; in various examples it may not be necessary to assemble the whole sub-block.

Figure 11:
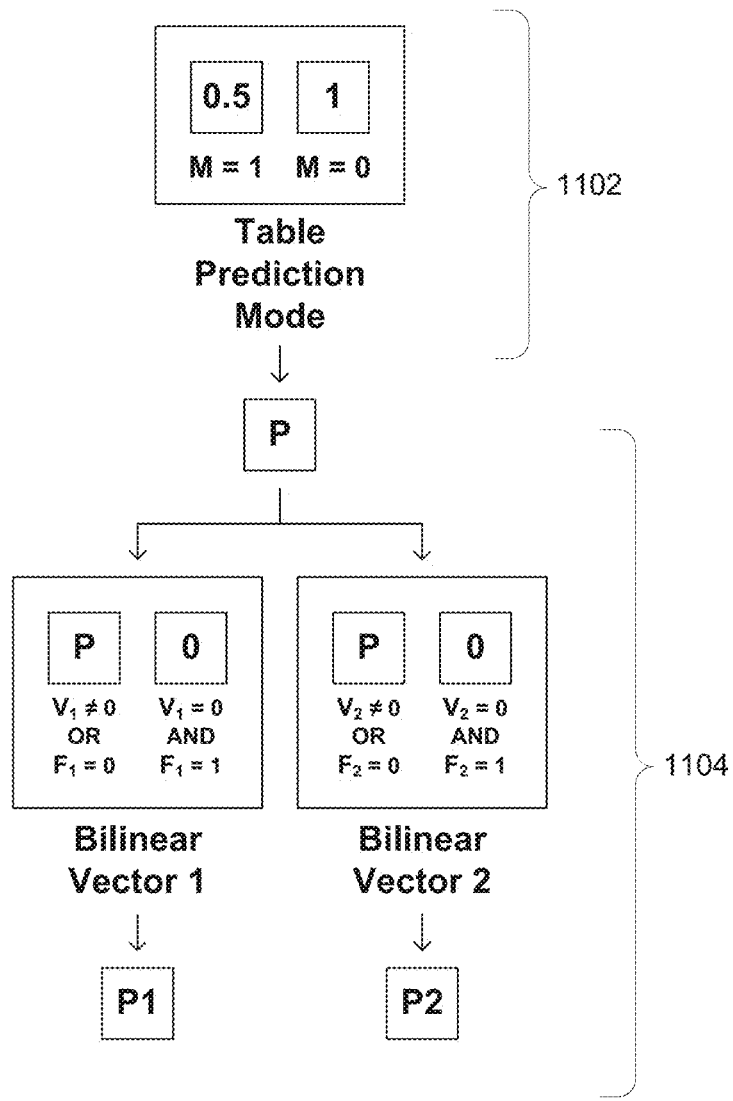
FIG. 11 is a graphical representation of a third stage of example decode operation from FIG. 6.

FIG. 11 shows a third stage in the sub-block decode operation which identifies a prediction mode for each of the two vectors $V_1$ and $V_2$. A single value is selected (operation 1102) based on the value of M (which as described above may be specified on a difference block level or have a default value). Then two values $P_1$ and $P_2$ (one for each vector) are determined based on the single value (from operation 1102) and the values of $V_1$ and $F_1$ (operation 1104). This operation ensures that for smooth areas, the prediction mode defaults to bilinear prediction.

The two values $P_1$ and $P_2$ from the third stage are fed into the fourth stage in the sub-block decode operation. As shown in FIG. 12, the two values are arranged into a quad based on the two rotation bits R 714 (operation 1202), with $P_1$ associated with block A and $P_2$ associated with block B. A single prediction value 1204 is then selected from the prediction quad (formed in operation 1202) using the least significant bits of the u,v coordinates (operation 1206).

Figure 14:
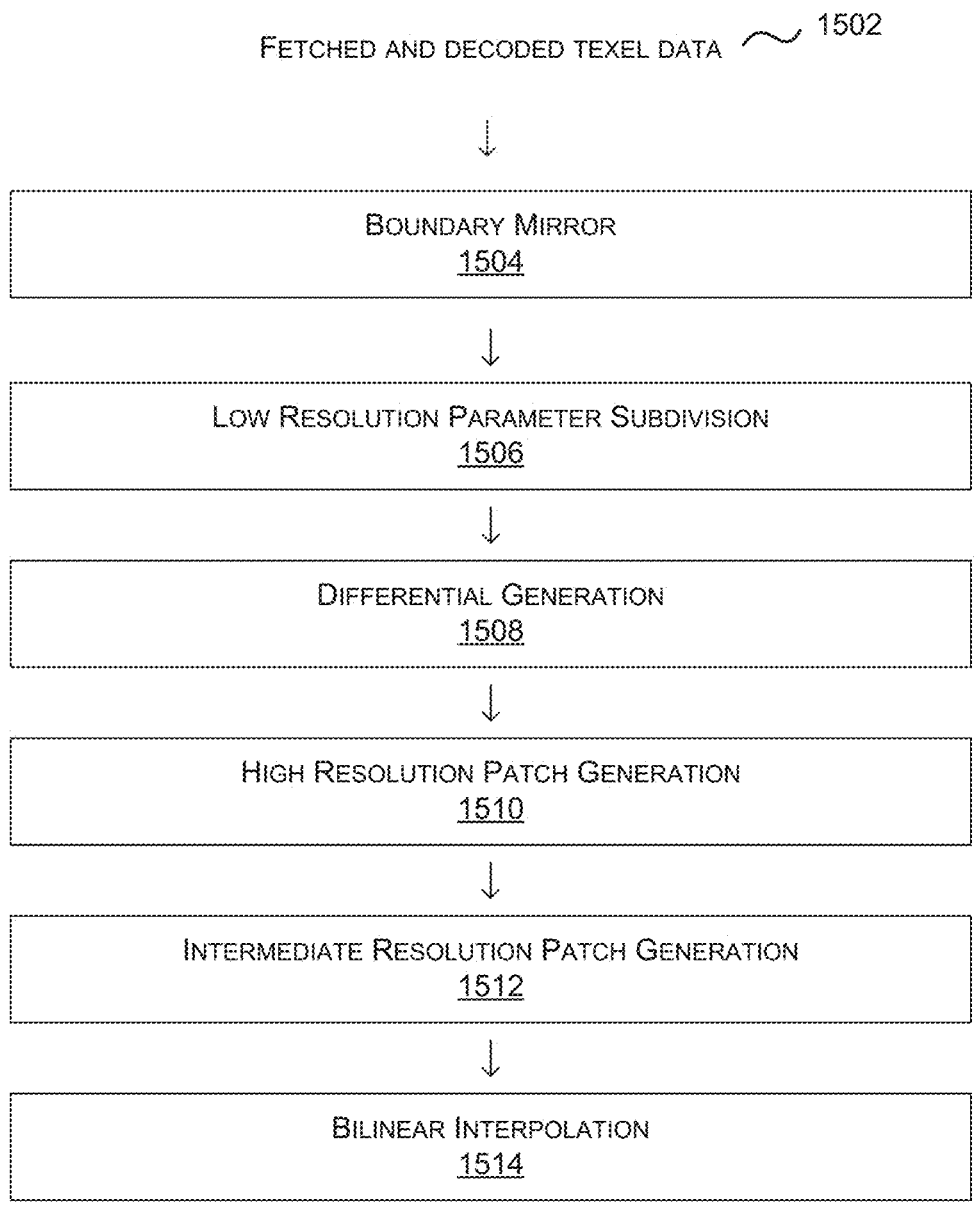
FIG. 14 is a flow diagram showing an example differential filter pipeline.
Figure 15:
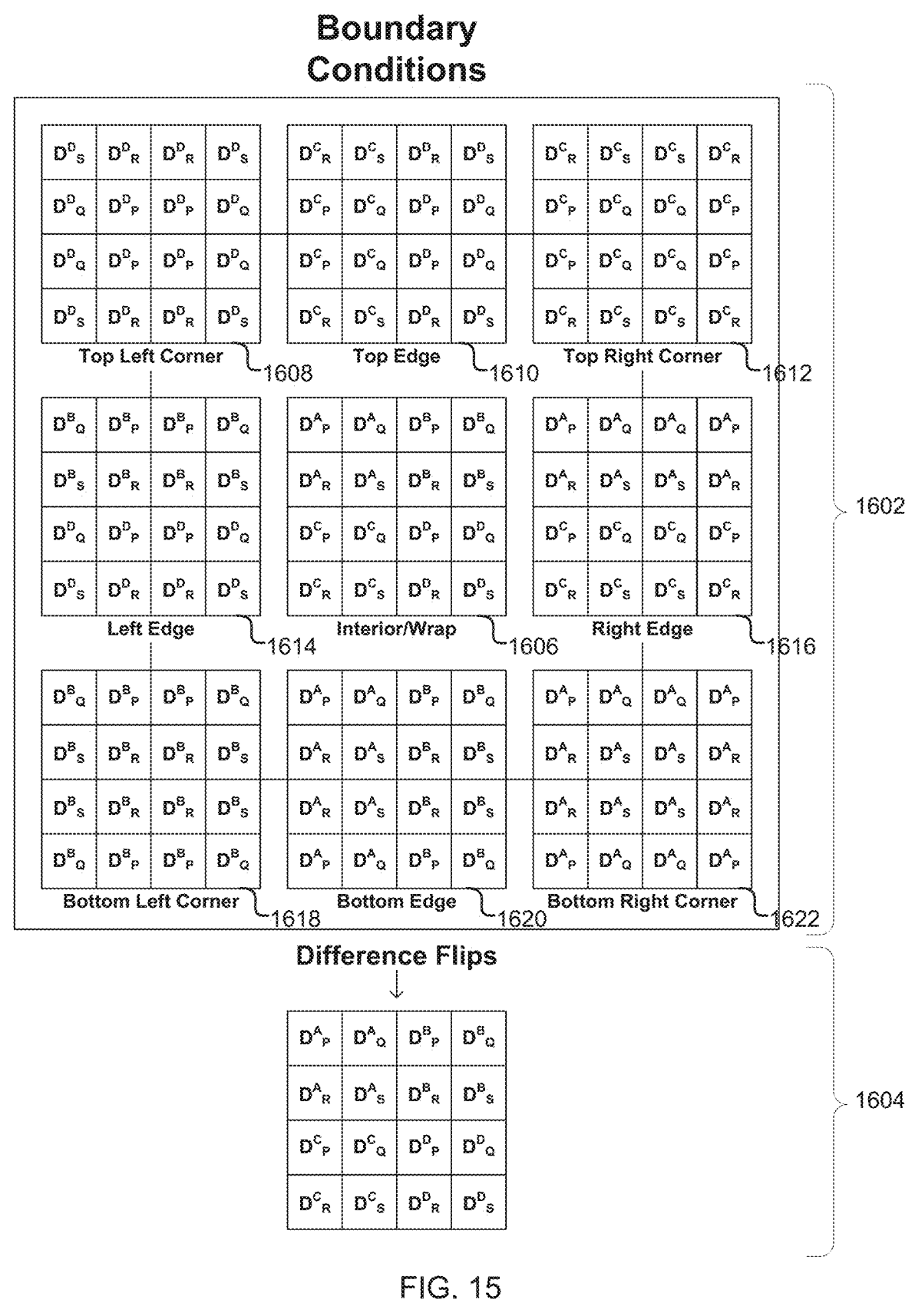

The operation of the filter sub-unit 531 can be described with reference to FIGS. 14-19. As shown in FIG. 14, the filter sub-unit 531 receives the fetched and decoded texel data 1502 (e.g. as shown graphically in FIG. 13) and the first operation applies boundary conditions (block 1504) which is shown graphically in FIG. 15. The boundary conditions which are applied determine how to stitch the 2×2 difference quads into a 4×4 quad and FIG. 15 shows 9 different ways that the 2×2 difference quads 1306 (from FIG. 13) can be stitched together (as indicated by bracket 1602) and depending upon where the texture is sampled, only one of these is used. For the description of subsequent stages of the method herein, the notation shown in quad 1604 is used irrespective of which of the quads is actually assembled (in block 1504).

When sampling along the edge of a texture (e.g. at the top left/right corners, bottom left/right corners or top/bottom/left/right edge), the sampling depends upon which boundary mode is set. Where the boundary mode is set to wrap, the opposite edges of the texture are considered to be connected to each other, e.g. if you are sampling along the right edge of a texture, a bilinear sample from each of the low and high resolution maps may require two texels from the right edge of the texture and a further two texels from the left edge of the texture. The arrangement of the 2×2 difference quads in the case of the boundary mode being set to wrap is shown in FIG. 15 (example 1606) and the same arrangement is used where the interior of the texture is sampled.

If the boundary mode is set to mirror or clamp instead of wrap, the texels on the edge being sampled are duplicated instead of using texels from the opposite edge (e.g. referring back to the earlier example, samples from the right edge may be duplicated instead of using texels from the left edge) as shown in examples 1608-1622. Although the mirror and clamp modes are two distinct texture modes, where the former reflects the texture along its boundaries, and the latter restricts the texture to its border outside the [0, 1] coordinate interval, both modes involve duplication of colours along the texture edges, so they can be handled by the same logic. In particular, if the boundary mode is set to clamp, the outer columns/rows of the patch are never used and so clamping can be thought of as mirroring the texture to handle interpolation across the boundary, but then restricting the texture coordinates so that they cannot exceed one or be less than zero.

Figure 16:
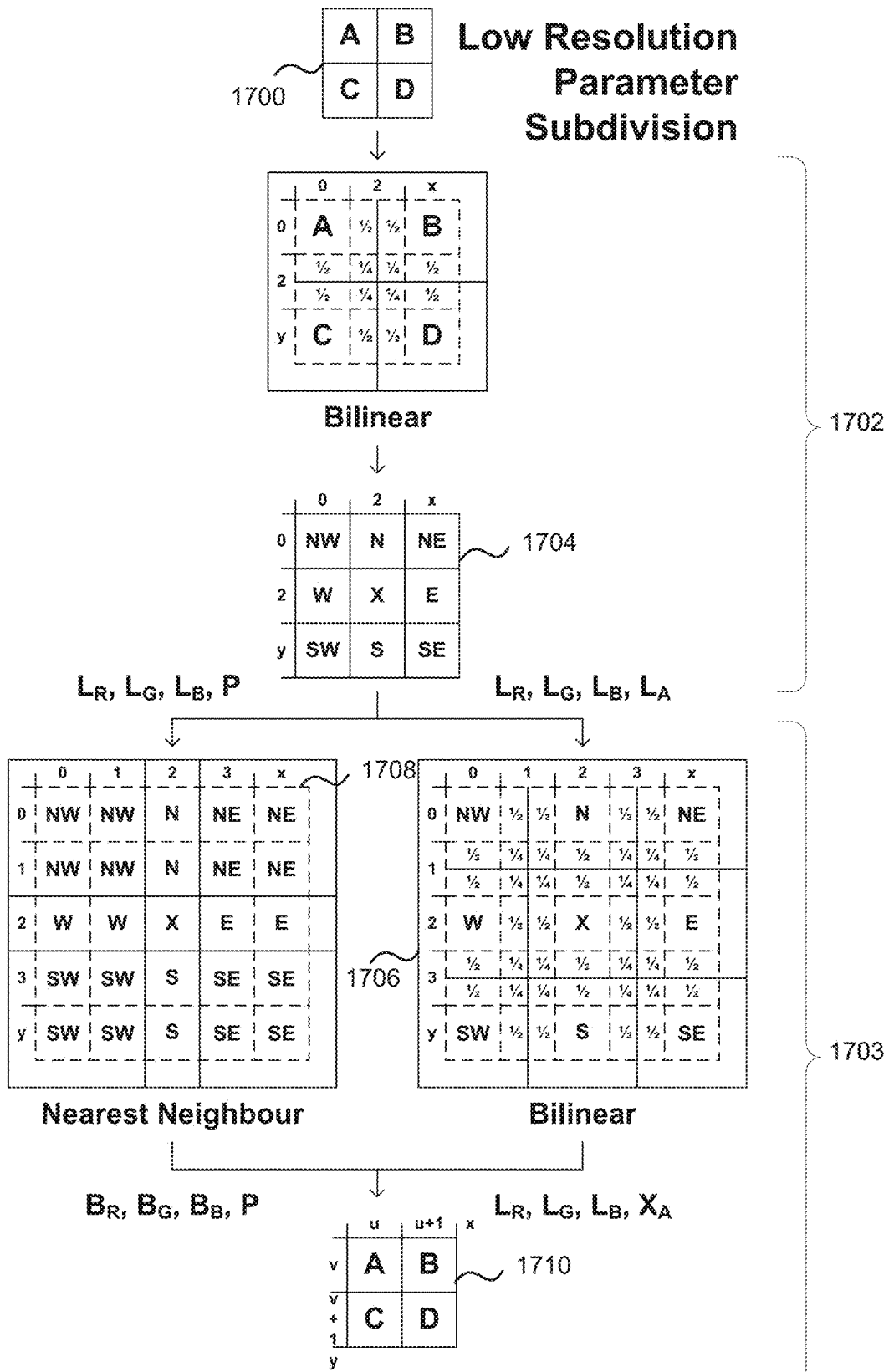
FIG. 16 is a graphical representation of low resolution parameter sub-division as in FIG. 14.
Figure 17:
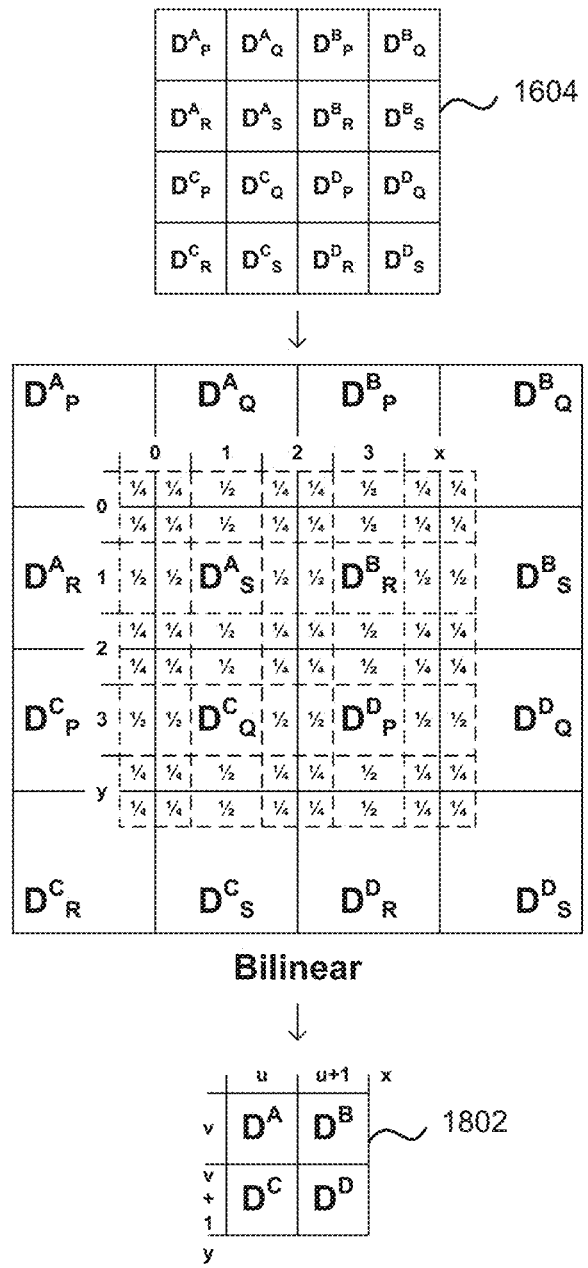
FIG. 17 is a graphical representation of differential generation as in FIG. 14.
Figure 19:
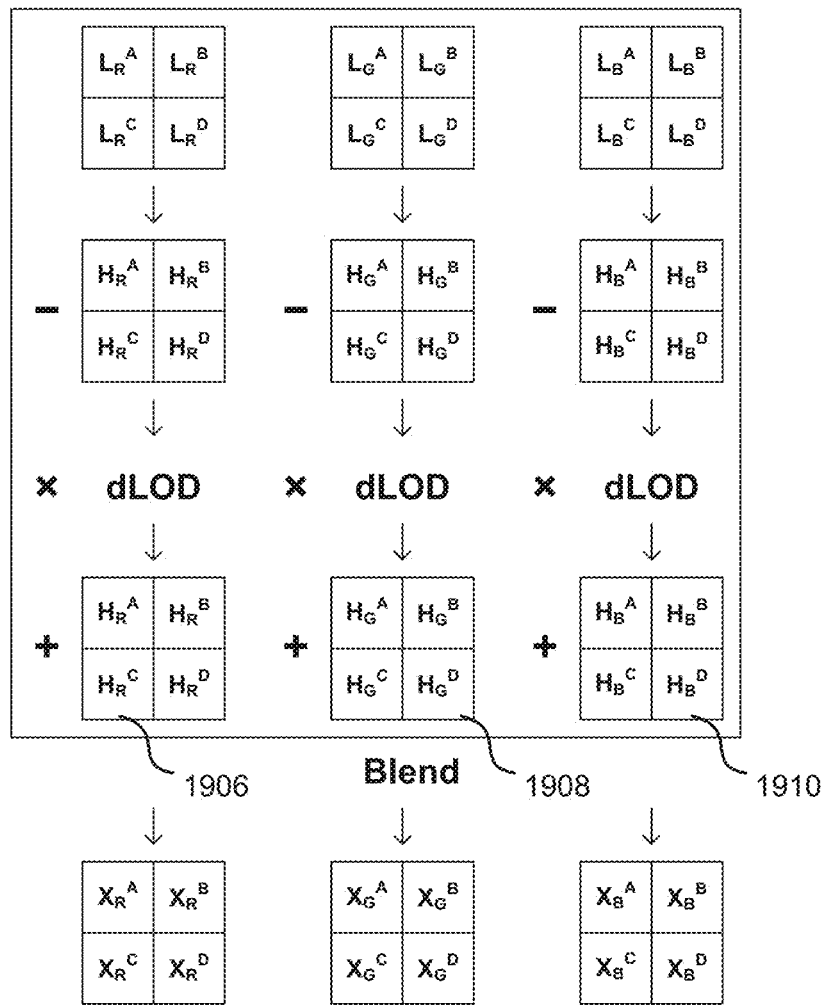
FIG. 19 is a graphical representation of intermediate resolution patch generation as in FIG. 14.

The pre-filter 528 in the filter sub-unit 531 generates both a low resolution patch and a high resolution patch and provides automatic trilinear filtering at low additional complexity as is also described in detail below. The generation of these patches entails sub-division of both low resolution data (two sub-divisions, block 1506, as shown in FIG. 16), from which the low resolution patch is directly derived, and high resolution data (one sub-division, block 1508, as shown in FIG. 17), which are combined with the low resolution data to construct the high resolution patch (block 1510, as shown in FIG. 17). This sub-division is performed so that linear interpolation can be performed on the high and low resolution patches (in block 1512, in the pre-filter 528, as shown in FIG. 19) before bilinear interpolation.

Low resolution parameter sub-division (block 1506) can be described with reference to FIG. 16. As described above, the low resolution parameters comprise five 2×2 quads 1310-1318 and each is treated in the manner shown in FIG. 16 and consequently, the method of FIG. 16 is shown for a generic 2×2 quad with the elements labelled A-D and where this may be any of the quads of low resolution parameters 1310-1318; however, as noted below, dependent upon which quad is being sub-divided, the second sub-division 1703 may follow one or both of two parallel paths.

The low resolution parameter sub-division (in block 1506) comprises performing two sub-division steps 1702, 1703 on a low resolution 2×2 quad 1700. The first sub-division 1702 uses bilinear sub-division and generates a 3×3 quad 1704 from the input 2×2 quad 1700, where the four corner blocks (NW, NE, SE, SW) have the same values as the four values in the input 2×2 quad 1700 (A, B, D, C respectively), the centre block (X) is a ¼ blend of each of the four values A-D and the other four blocks (N, E, S, W) are a half-blend of their two immediate neighbours (e.g. N is a ½ blend of A and B, E is a ½ blend of B and D, etc.)

The resultant 3×3 quad 1704 is then sub-divided in a second sub-division step 1703 and depending upon which quad of low resolution parameters 1310-1318 parameters, this may involve one or both of the two separate operations shown (and which use different sub-division techniques) to generate one or two 5×5 quads 1706, 1708. One 5×5 quad 1706 is formed using bilinear sub-division in a similar manner to the generation of the 3×3 quad 1704 (e.g. such that the block between blocks NW and N is a ½ blend of NW and N). The other 5×5 quad 1708 is formed using nearest neighbour sub-division and so the newly created sub-divided blocks are clamped to their nearest corner. A 2×2 quad 1710 selected from each generated 5×5 quad based on coordinates which are labelled u, u+1, v and v+1 in FIG. 16 and which are the top two bits of the fractional u,v, coordinates generated in the texture lookup described above.

As noted above, the low resolution parameter sub-division, as shown in FIG. 16, is repeated for each of the low resolution 2×2 quads 1308-1318 and different quads follow different paths in the second sub-division step 1703. Parameters $L_R$, $L_G$ and LB (quads 1310, 1312, 1314) take both the 'nearest neighbour' path and the 'bilinear' path and so generate two 5×5 quads 1708, 1710. A 2×2 quad 1710 is then selected from each of these generated 5×5 quads 1708, 1710. Of these, the $L_R$, $L_G$ and $L_B$ quads that followed the nearest neighbour path are henceforth relabelled as BR, BG and BB to disambiguate them from those that followed the bilinear path, which remain $L_R$, $L_G$ and $L_B$. Parameters P (quad 1318) only take the 'nearest neighbour' path and so generate a single 5×5 quad 1708 from which a 2×2 quad 1710 is then selected. Parameters LA (quad 1316) only take the 'bilinear' path and so generate a single 5×5 quad 1706 from which a 2×2 quad 1710 is then selected. No further processing is required for the LA parameter quad (block 528) before the final bilinear interpolation (block 529) and so it bypasses all further stages and is consequently relabelled as $X_A$, to match the other bilinear channels output in in FIG. 19.

The differential generation (in block 1508) involves a single sub-division as can be described with reference to FIG. 17. The input is the 4×4 difference quad 1604 as generated by applying the boundary conditions (in block 1504). Bilinear sub-division is used and this results in a 5×5 quad from which a 2×2 quad 1802 is selected using the same coordinates as used in the low resolution parameter sub-division (in block 1506).

Figure 18:
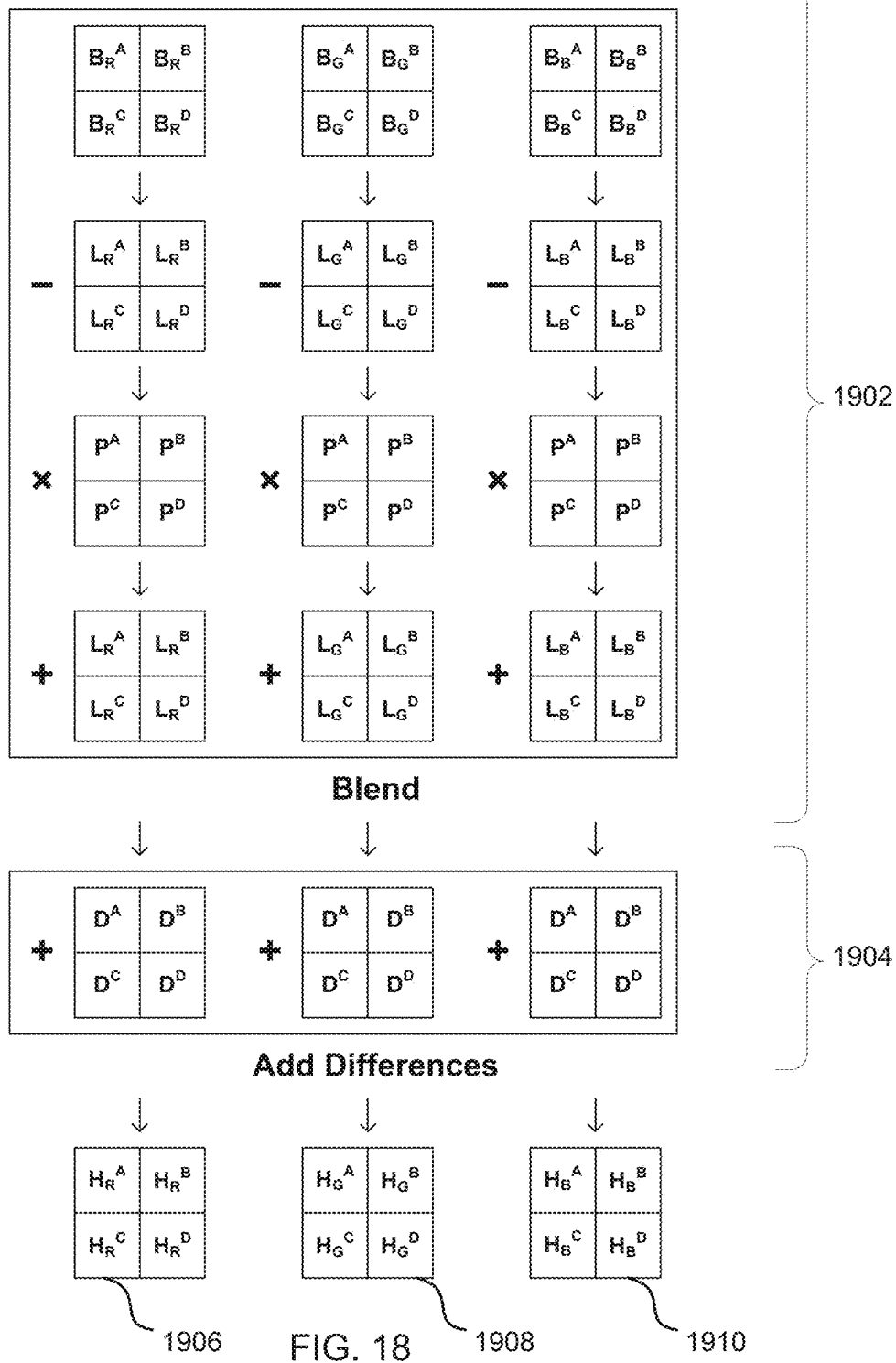
FIG. 18 is a graphical representation of high resolution patch generation as in FIG. 14.

The high resolution patch generation (in block 1510) can be described with reference FIG. 18. It involves, for each of the RGB channels, linear interpolation (indicated by bracket 1902) of the 2×2 quads 1710 generated by low resolution parameter sub-division (in block 1506) followed by the addition (indicated by bracket 1904) of the difference 2×2 quad 1802 generated in the differential generation (in block 1508) and the output is one 2×2 quad 1906-1910 for each of the RGB channels. The resultant 2×2 quads 1906-1910 are at the high resolution. These values may then be clamped to ensure they remain within the range of possible values (0 to 255 for LDR textures).

A patch at a required intermediate resolution can then be generated (in block 1512) by blending between the high resolution 2×2 quads 1906-1910 and the sub-divided low resolution quads generated by the low resolution parameter sub-division (in block 1506), based on the required intermediate level of detail (dLOD), as shown in FIG. 19. The operations shown in FIG. 19 are performed sequentially: first performing the subtraction (L−H), then multiplication by the intermediate level of detail (x dLOD) before addition of the high resolution values (+H). The same sequence of operations is performed in FIG. 18 (in bracket 1902); it is equivalent to the expression (1−f)*A+f*B.

The pre-filter 528 outputs a single bilinear patch for each of the RGBA channels which is a linear interpolation of the low and high resolution patches generated within the pre-filter (as shown in FIG. 19), with the exception of the alpha channel which is generated during the low resolution parameter subdivision 1506. This output patch is closer to the target sample location (i.e. for the target level of detail); however, it may not exactly match the target sample position because only the integral parts of the result of the 4 times multiplication of the fractional parts of texel address calculation are used (as described above). Consequently any fractional parts of the result of the 4 times multiplication are subsequently used by the bilinear filtering unit 530 to perform bilinear filtering (block 1514) on the output from the pre-filter 528 to generate an output patch at the target level of detail (and hence at the target sample locations). If there are no fractional parts then the output from the pre-filter 528 (and block 1512) is already at the target sample position and no bilinear filtering is required.

As described above, the bilinear filtering unit 530 performs bilinear filtering on the output from the pre-filter 528.

Although it is not shown in FIG. 14, in various examples, gamma correction may be performed between the output of the pre-filter 528 and the input to the bilinear filtering unit. Alternatively, gamma correction can be performed on the down-sampled images (i.e. after the bilinear filtering unit).

Although the methods and apparatus are described above in terms of textures (where a texture is defined as any bitmapped image used in 3D rendering), the methods and apparatus described herein may be more broadly applied to bitmapped images in general.

The encoder and decoder of FIG. 5 are shown as comprising a number of functional blocks. This is schematic only and is not intended to define a strict division between different logic elements of such entities. Each functional block may be provided in any suitable manner. It is to be understood that intermediate values described herein as being formed by a functional block need not be physically generated by the functional block at any point and may merely represent logical values which conveniently describe the processing performed by the functional block between its input and output.

A first further example provides an encoder for encoding image data, the encoder comprising: an input arranged to receive a first image and a second image, wherein the second image is twice the width and height of the first image; a prediction generator arranged to generate a prediction image from the first image using an adaptive interpolator, a difference texture generator arranged to generate a difference image from the prediction image and the second image; and an encoder unit arranged to encode the difference image.

A second further example provides a decoder unit configured to sample compressed image data, the compressed image data comprising interleaved blocks of data encoding a first image and blocks of data encoding differences between the first image and a second image, wherein the second image is twice the width and the height of the first image, the decoder unit comprising: a fetch unit arranged to identify four neighbouring pixels based on coordinates of a sample position and to fetch encoded data from the compressed image data for each of the four pixels, the fetched encoded data comprising, for each pixel, an encoded block of the first image and a sub-block from an encoded block of the differences between the first and second images, along with information on how to predict the second image from the first; a first decoder arranged to decode the fetched encoded blocks of the first image; a difference decoder arranged to decode the fetched encoded sub-blocks of the differences between the first and second images and output a difference quad and a prediction value for each of the four pixels; and a filter sub-unit arranged to generate a reconstruction of the image at the sample position using the decoded blocks of the first image, difference quads and prediction values.

In various examples, the first image and the second image are textures and the pixels are texels.

In various examples, the decoder further comprises one or more vector lookup tables and wherein a fetched encoded sub-block comprises an identifier for a first vector and an identifier for a second vector (713) and wherein the difference decoder is arranged, for each pixel, to decode the fetched encoded sub-block of the differences between the first and second images by combining the first and second vectors selected from one of the vector lookup tables using the identifiers to form a decoded sub-block. In various examples, the fetched encoded data further comprises, for each pixel, a prediction mode bit for the fetched sub-block and wherein the difference decoder is further arranged, for each pixel, to decode the fetched encoded sub-block of the differences between the first and second images by selecting a vector lookup table to use based on the prediction mode bit. In various examples, a fetched encoded sub-block further comprises one or more additional bits and wherein the difference decoder is further arranged to flip the first and/or second vectors and/or rotate both the first and second vectors when combining the first and second vectors based on the one or more additional bits. In various examples, the difference decoder is further arranged, for each pixel, to identify a prediction mode for each of the first and second vectors using the prediction mode bit and one of the additional bits and to generate a prediction value using the prediction mode for each vector and at least one other of the additional bits. In various examples, the difference decoder is further arranged, for each pixel, to select a difference quad from the decoded sub-block using one or more least significant bits of the coordinates of the sample position.

In various examples, the filter sub-unit comprises: a pre-filter arranged to generate a high resolution patch and a low resolution patch using the decoded block of the first image, difference quad and prediction value for each of the four pixels and to linearly interpolate between the two patches using a first part of the coordinates of the sample position; and a bilinear filtering unit arranged to perform bilinear filtering on a linearly interpolated output of the pre-filter using a second part of the coordinates of the sample position to generate the reconstruction of the image at the sample position. In various examples, the pre-filter is arranged to generate the high resolution patch and the low resolution patch by combining the difference quads for each of the four pixels into a single larger difference quad by applying boundary conditions. In various examples, the pre-filter is further arranged to generate the high resolution patch and the low resolution patch by: sub-dividing the decoded blocks of the first image and the prediction values twice; and sub-dividing the single larger difference quad once. In various examples, the pre-filter is further arranged to generate the high resolution patch by: selecting a portion of each of the sub-divided decoded blocks and prediction values; linearly interpolating the selected portions; and adding a portion selected from the sub-divided single larger difference quad.

A third further example provides a decoder unit configured to sample compressed image data, the compressed image data comprising interleaved blocks of data encoding a first image and blocks of data encoding differences between the first image and a second image, wherein the second image is twice the width and the height of the first image, the decoder unit comprising: a decoder sub-unit arranged to fetch and decode encoded data from the compressed image data based on coordinates of a sample position; and a filter sub-unit arranged to generate a reconstruction of the image at the sample position using the decoded blocks of the first image, difference quads and prediction values output by the decoder sub-unit, wherein the filter sub-unit comprises: a pre-filter arranged to generate a high resolution patch and a low resolution patch using the decoded block of the first image, difference quad and prediction value for each of four neighbouring pixels identified based on the coordinates of a sample position and to linearly interpolate between the two patches using a first part of the coordinates of the sample position; and a bilinear filtering unit arranged to perform bilinear filtering on a linearly interpolated output of the pre-filter using a second part of the coordinates of the sample position to generate the reconstruction of the image at the sample position.

In various examples, the first image and the second image are textures.

In various examples, the pre-filter is arranged to generate the high resolution patch and the low resolution patch by combining the difference quads for each of the four pixels into a single larger difference quad by applying boundary conditions. In various examples, the pre-filter is further arranged to generate the high resolution patch and the low resolution patch by: sub-dividing the decoded blocks of the first image and the prediction values twice; and sub-dividing the single larger difference quad once. In various examples, the pre-filter is further arranged to generate the high resolution patch by: selecting a portion of each of the sub-divided decoded blocks and prediction values; linearly interpolating the selected portions; and adding a portion selected from the sub-divided single larger difference quad.

In various examples, the decoder sub-unit comprises: a fetch unit arranged to identify the four neighbouring pixels based on coordinates of a sample position and to fetch encoded data from the compressed image data for each of the four pixels, the fetched encoded data comprising, for each pixel, an encoded block of the first image and a sub-block from an encoded block of the differences between the first and second images, along with information on how to predict the second image from the first; a first decoder arranged to decode the fetched encoded blocks of the first image; and a difference decoder arranged to decode the fetched encoded sub-blocks of the differences between the first and second images and output a difference quad and a prediction value for each of the four pixels.

In various examples, the decoder sub-unit further comprises one or more vector lookup tables and wherein a fetched encoded sub-block comprises an identifier for a first vector and an identifier for a second vector and wherein the difference decoder is arranged, for each pixel, to decode the fetched encoded sub-block of the differences between the first and second images by combining the first and second vectors selected from one of the vector lookup tables using the identifiers to form a decoded sub-block. In various examples, the fetched encoded data further comprises, for each pixel, a prediction mode bit for the fetched sub-block and wherein the difference decoder is further arranged, for each pixel, to decode the fetched encoded sub-block of the differences between the first and second images by selecting a vector lookup table to use based on the prediction mode bit. In various examples, a fetched encoded sub-block further comprises one or more additional bits and wherein the difference decoder is further arranged to flip the first and/or second vectors and/or rotate the first and second vectors when combining the first and second vectors based on the one or more additional bits. In various examples, the difference decoder is further arranged, for each pixel, to identify a prediction mode for each of the first and second vectors using the prediction mode bit and one of the additional bits and to generate a prediction value using the prediction mode for each vector and at least one other of the additional bits. In various examples, the difference decoder is further arranged, for each pixel, to select a difference quad from the decoded sub-block using one or more least significant bits of the coordinates of the sample position.

In various examples, the first image and the second image are different textures and wherein the pixels are texels.

A fourth further example provides a method of encoding image data comprising: receiving, at an input, a first image and a second image, wherein the second image is twice the width and height of the first image; generating, in a prediction generator, a prediction image from the first image using an adaptive interpolator, generating, in a difference texture generator, a difference image from the prediction image and the second image; and encoding, in an encoder unit, the difference image.

A fifth further example provides a method of sampling compressed image data, the compressed image data comprising interleaved blocks of data encoding a first image and blocks of data encoding differences between the first image and a second image, wherein the second image is twice the width and the height of the first image, the method comprising: identifying, in a fetch unit, four neighbouring pixels based on coordinates of a sample position; fetching, by the fetch unit, encoded data from the compressed image data for each of the four pixels, the fetched encoded data comprising, for each pixel, an encoded block of the first image and a sub-block from an encoded block of the differences between the first and second images, along with information on how to predict the second image from the first; decoding, in a first decoder, the fetched encoded blocks of the first image; decoding, in a difference decoder, the fetched encoded sub-blocks of the differences between the first and second images; outputting, from the difference decoder, a difference quad and a prediction value for each of the four pixels; and generating, in a filter sub-unit, a reconstruction of the image at the sample position using the decoded blocks of the first image, difference quads and prediction values.

In various examples, the first image and the second image are textures and the pixels are texels.

In various examples, a fetched encoded sub-block comprises an identifier for a first vector and an identifier for a second vector and decoding the fetched encoded sub-blocks of the differences between the first and second images comprises, for each pixel: decoding the fetched encoded sub-block of the differences between the first and second images by combining the first and second vectors selected from one of a plurality of vector lookup tables using the identifiers to form a decoded sub-block. In various examples, the fetched encoded data further comprises, for each pixel, a prediction mode bit for the fetched sub-block and decoding the fetched encoded sub-blocks of the differences between the first and second images further comprises, for each pixel: decoding the fetched encoded sub-block of the differences between the first and second images by selecting a vector lookup table to use based on the prediction mode bit. In various examples, a fetched encoded sub-block further comprises one or more additional bits and decoding the fetched encoded sub-blocks of the differences between the first and second images further comprises: flipping the first and/or second vectors and/or rotating both the first and second vectors when combining the first and second vectors based on the one or more additional bits. In various examples, decoding the fetched encoded sub-blocks of the differences between the first and second images further comprises, for each pixel: identifying a prediction mode for each of the first and second vectors using the prediction mode bit and one of the additional bits; and generating a prediction value using the prediction mode for each vector and at least one other of the additional bits. In various examples, decoding the fetched encoded sub-blocks of the differences between the first and second images further comprises, for each pixel: selecting a difference quad from the decoded sub-block using one or more least significant bits of the coordinates of the sample position.

In various examples, generating a reconstruction of the image at the sample position using the decoded blocks of the first image, difference quads and prediction values comprises: generating a high resolution patch and a low resolution patch using the decoded block of the first image, difference quad and prediction value for each of the four pixels; linearly interpolating between the two patches using a first part of the coordinates of the sample position to generate a linearly interpolated output; and performing bilinear filtering on the linearly interpolated output using a second part of the coordinates of the sample position to generate the reconstruction of the image at the sample position. In various examples, generating a high resolution patch and a low resolution patch using the decoded block of the first image, difference quad and prediction value for each of the four pixels comprises: combining the difference quads for each of the four pixels into a single larger difference quad by applying boundary conditions. In various examples, generating a high resolution patch and a low resolution patch using the decoded block of the first image, difference quad and prediction value for each of the four pixels further comprises: sub-dividing the decoded blocks of the first image and the prediction values twice; and sub-dividing the single larger difference quad once. In various examples, generating the high resolution patch further comprises: selecting a portion of each of the sub-divided decoded blocks and prediction values; linearly interpolating the selected portions; and adding a portion selected from the sub-divided single larger difference quad.

A sixth further example provides a method of sampling compressed image data, the compressed image data comprising interleaved blocks of data encoding a first image and blocks of data encoding differences between the first image and a second image, wherein the second image is twice the width and the height of the first image, the method comprising: fetching and decoding encoded data from the compressed image data based on coordinates of a sample position; and generating a reconstruction of the image at the sample position using the decoded blocks of the first image, difference quads and prediction values output by the decoder sub-unit by: generating a high resolution patch and a low resolution patch using the decoded block of the first image, difference quad and prediction value for each of four neighbouring pixels identified based on the coordinates of a sample position; linearly interpolating between the two patches using a first part of the coordinates of the sample position to generate a linearly interpolated output; and performing bilinear filtering on the linearly interpolated output using a second part of the coordinates of the sample position to generate the reconstruction of the image at the sample position.

In various examples, the first image and the second image are textures.

In various examples, generating the high resolution patch and the low resolution patch comprises: combining the difference quads for each of the four pixels into a single larger difference quad by applying boundary conditions. In various examples, generating the high resolution patch and the low resolution patch further comprises: sub-dividing the decoded blocks of the first image and the prediction values twice; and sub-dividing the single larger difference quad once. In various examples, generating the high resolution patch further comprises: selecting a portion of each of the sub-divided decoded blocks and prediction values; linearly interpolating the selected portions; and adding a portion selected from the sub-divided single larger difference quad.

In various examples, fetching and decoding encoded data from the compressed image data based on coordinates of a sample position comprises: identifying the four neighbouring pixels based on coordinates of a sample position; fetching encoded data from the compressed image data for each of the four pixels, the fetched encoded data comprising, for each pixel, an encoded block of the first image and a sub-block from an encoded block of the differences between the first and second images, along with information on how to predict the second image from the first; decoding the fetched encoded blocks of the first image; decoding the fetched encoded sub-blocks of the differences between the first and second images; and outputting a difference quad and a prediction value for each of the four pixels. In various examples, a fetched encoded sub-block comprises an identifier for a first vector and an identifier for a second vector and wherein decoding the fetched encoded sub-blocks of the differences between the first and second images comprises, for each pixel: decoding the fetched encoded sub-block of the differences between the first and second images by combining the first and second vectors selected from one of the vector lookup tables using the identifiers to form a decoded sub-block. In various examples, the fetched encoded data further comprises, for each pixel, a prediction mode bit for the fetched sub-block and wherein decoding the fetched encoded sub-blocks of the differences between the first and second images further comprises, for each pixel: decoding the fetched encoded sub-block of the differences between the first and second images by selecting a vector lookup table to use based on the prediction mode bit. In various examples, a fetched encoded sub-block further comprises one or more additional bits and wherein decoding the fetched encoded sub-blocks of the differences between the first and second images further comprises: flipping the first and/or second vectors and/or rotating the first and second vectors when combining the first and second vectors based on the one or more additional bits. In various examples, decoding the fetched encoded sub-blocks of the differences between the first and second images further comprises, for each pixel: identifying a prediction mode for each of the first and second vectors using the prediction mode bit and one of the additional bits; and generating a prediction value using the prediction mode for each vector and at least one other of the additional bits.

In various examples, decoding the fetched encoded sub-blocks of the differences between the first and second images further comprises, for each pixel: selecting a difference quad from the decoded sub-block using one or more least significant bits of the coordinates of the sample position.

In various examples, the first image and the second image are different textures and wherein the pixels are texels.

A seventh further example provides an integrated circuit manufacturing system comprising: a non-transitory computer readable storage medium having stored thereon a computer readable description of an integrated circuit that describes an encoder and/or decoder unit as described herein; a layout processing system configured to process the integrated circuit description so as to generate a circuit layout description of an integrated circuit embodying the encoder and/or decoder unit; and an integrated circuit generation system configured to manufacture the encoder and/or decoder unit according to the circuit layout description.

Further examples provide: an encoder configured to perform any of the encoding methods described herein, wherein in various examples the encoder is embodied in hardware on an integrated circuit, and a decoder unit configured to perform any of the decoding methods described herein, wherein in various examples the decoder unit is embodied in hardware on an integrated circuit. Yet further examples provide a method of manufacturing an encoder and/or a decoder unit as described herein and computer readable code (which in various examples may be encoded on a computer readable medium) configured to cause any of the methods described herein to be performed when the code is run. Yet further examples provide an integrated circuit definition dataset that, when processed in an integrated circuit manufacturing system, configures the integrated circuit manufacturing system to manufacture an encoder and/or a decoder unit as described herein and a non-transitory computer readable storage medium having stored thereon a computer readable description of an integrated circuit that, when processed in an integrated circuit manufacturing system, causes the integrated circuit manufacturing system to manufacture an encoder and/or a decoder unit as described herein. Yet further examples provide an integrated circuit manufacturing system configured to manufacture an encoder and/or a decoder unit as described herein.

The encoder and decoder described herein may be embodied in hardware on an integrated circuit. The encoder and decoder described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture an encoder and/or decoder configured to perform any of the methods described herein, or to manufacture an encoder and/or decoder comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an encoder and/or decoder as described herein will now be described with respect to FIG. 20.

Figure 20:
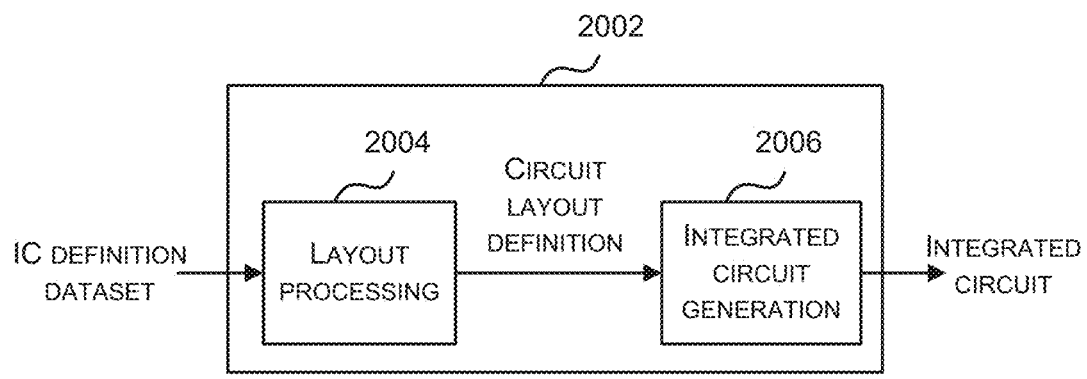
FIG. 20 shows an integrated circuit manufacturing system for generating an integrated circuit embodying an encoder or decoder unit.

FIG. 20 shows an example of an integrated circuit (IC) manufacturing system 2002 which is configured to manufacture an encoder and/or decoder as described in any of the examples herein. In particular, the IC manufacturing system 2002 comprises a layout processing system 2004 and an integrated circuit generation system 2006. The IC manufacturing system 2002 is configured to receive an IC definition dataset (e.g. defining an encoder and/or decoder as described in any of the examples herein), process the IC definition dataset, and generate an IC according to the IC definition dataset (e.g. which embodies an encoder and/or decoder as described in any of the examples herein). The processing of the IC definition dataset configures the IC manufacturing system 2002 to manufacture an integrated circuit embodying an encoder and/or decoder as described in any of the examples herein.

The layout processing system 2004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 2004 has determined the circuit layout it may output a circuit layout definition to the IC generation system 2006. A circuit layout definition may be, for example, a circuit layout description.

The IC generation system 2006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 2006 may be in the form of computer-readable code which the IC generation system 2006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an encoder and/or decoder without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 20 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 20, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A decoder unit configured to sample compressed image data, the compressed image data comprising interleaved blocks of data encoding a first image and blocks of data encoding differences between the first image and a second image, wherein the second image is twice the width and the height of the first image, the decoder unit comprising:
a difference decoder arranged to decode a fetched encoded sub-block of the differences between the first and second images and output a difference quad and a prediction value for a pixel; and
a filter sub-unit arranged to generate a reconstruction of the image at a sample position using decoded blocks of the first image, the difference quad and the prediction value.

2. The decoder unit according to claim 1, wherein the first image and the second image are textures and the pixels are texels.

3. The decoder unit according to claim 1, further comprising one or more vector lookup tables and wherein a fetched encoded sub-block comprises an identifier for a first vector and an identifier for a second vector and wherein the difference decoder is arranged to decode the fetched encoded sub-block of the differences between the first and second images by combining the first and second vectors selected from one of the vector lookup tables using the identifiers to form a decoded sub-block.

4. The decoder unit according to claim 3, wherein the difference decoder is further arranged to select a difference quad from the decoded sub-block using one or more least significant bits of the coordinates of the sample position.

5. The decoder unit according to claim 3, wherein the fetched encoded data further comprises a prediction mode bit for the fetched sub-block and wherein the difference decoder is further arranged to decode the fetched encoded sub-block of the differences between the first and second images by selecting a vector lookup table to use based on the prediction mode bit.

6. The decoder unit according to claim 5, wherein a fetched encoded sub-block further comprises one or more additional bits and wherein the difference decoder is further arranged to flip the first and/or second vectors and/or rotate both the first and second vectors when combining the first and second vectors based on the one or more additional bits.

7. The decoder unit according to claim 6, wherein the difference decoder is further arranged to identify a prediction mode for each of the first and second vectors using the prediction mode bit and one of the additional bits and to generate a prediction value using the prediction mode for each vector and at least one other of the additional bits.

8. The decoder unit according to claim 3, wherein the filter sub-unit comprises:
a pre-filter arranged to generate a high resolution patch and a low resolution patch using the decoded block of the first image, difference quad and prediction value for the pixel and to linearly interpolate between the two patches using a first part of the coordinates of the sample position; and
a bilinear filtering unit arranged to perform bilinear filtering on a linearly interpolated output of the pre-filter using a second part of the coordinates of the sample position to generate the reconstruction of the image at the sample position.

9. The decoder unit according to claim 8, wherein the pre-filter is arranged to generate the high resolution patch and the low resolution patch by combining the difference quads for each of four neighbouring pixels into a single larger difference quad by applying boundary conditions.

10. The decoder unit according to claim 9, wherein the pre-filter is further arranged to generate the high resolution patch and the low resolution patch by:
sub-dividing the decoded blocks of the first image and the prediction values twice;
sub-dividing the single larger difference quad once;
selecting a portion of each of the sub-divided decoded blocks and prediction values;
linearly interpolating the selected portions; and
adding a portion selected from the sub-divided single larger difference quad.

11. The method according to claim 10, wherein generating a reconstruction of the image at the sample position using decoded blocks of the first image, the difference quad and the prediction value comprises:
generating a high resolution patch and a low resolution patch using the decoded block of the first image, difference quad and prediction value for the pixel;
linearly interpolating between the two patches using a first part of the coordinates of the sample position to generate a linearly interpolated output; and
performing bilinear filtering on the linearly interpolated output using a second part of the coordinates of the sample position to generate the reconstruction of the image at the sample position.

12. The method according to claim 11, wherein generating a high resolution patch and a low resolution patch using the decoded block of the first image, difference quad and prediction value comprises:
combining the difference quads for each of four neighbouring pixels into a single larger difference quad by applying boundary conditions.

13. A method of sampling compressed image data, the compressed image data comprising interleaved blocks of data encoding a first image and blocks of data encoding differences between the first image and a second image, wherein the second image is twice the width and the height of the first image, the method comprising:
decoding, in a difference decoder, a fetched encoded sub-block of the differences between the first and second images;
outputting, from the difference decoder, a difference quad and a prediction value for a pixel; and
generating, in a filter sub-unit, a reconstruction of the image at a sample position using decoded blocks of the first image, the difference quad and the prediction value.

14. The method according to claim 13, wherein the first image and the second image are textures and the pixels are texels.

15. The method according to claim 13, wherein a fetched encoded sub-block comprises an identifier for a first vector and an identifier for a second vector and decoding the fetched encoded sub-block of the differences between the first and second images comprises:
decoding the fetched encoded sub-block of the differences between the first and second images by combining the first and second vectors selected from one of a plurality of vector lookup tables using the identifiers to form a decoded sub-block.

16. The method according to claim 15, wherein decoding the fetched encoded sub-block of the differences between the first and second images further comprises:

selecting a difference quad from the decoded sub-block using one or more least significant bits of the coordinates of the sample position.

17. The method according to claim 15, wherein the fetched encoded data further comprises a prediction mode bit for the fetched sub-block and decoding the fetched encoded sub-block of the differences between the first and second images further comprises:

decoding the fetched encoded sub-block of the differences between the first and second images by selecting a vector lookup table to use based on the prediction mode bit.

18. The method according to claim 17, wherein a fetched encoded sub-block further comprises one or more additional bits and decoding the fetched encoded sub-block of the differences between the first and second images further comprises:

flipping the first and/or second vectors and/or rotating both the first and second vectors when combining the first and second vectors based on the one or more additional bits.

19. The method according to claim 18, wherein decoding the fetched encoded sub-block of the differences between the first and second images further comprises:

identifying a prediction mode for each of the first and second vectors using the prediction mode bit and one of the additional bits; and generating a prediction value using the prediction mode for each vector and at least one other of the additional bits.

20. An integrated circuit manufacturing system comprising:

a non-transitory computer readable storage medium having stored thereon a computer readable description of an integrated circuit that describes a decoder unit;

a layout processing system configured to process the integrated circuit description so as to generate a circuit layout description of an integrated circuit embodying the decoder unit; and an integrated circuit generation system configured to manufacture the decoder unit according to the circuit layout description, wherein the decoder unit comprises:

a difference decoder arranged to decode a fetched encoded sub-block of the differences between the first and second images and output a difference quad and a prediction value for a pixel; and a filter sub-unit arranged to generate a reconstruction of the image at the sample position using decoded blocks of the first image, the difference quad and the prediction value.

* * * * *